United States Patent
Hiranuma et al.

(10) Patent No.: US 8,356,472 B2
(45) Date of Patent: Jan. 22, 2013

(54) EXHAUST PURIFICATION DEVICE FOR HYBRID ELECTRIC VEHICLE

(75) Inventors: Satoshi Hiranuma, Kawasaki (JP); Minehiro Murata, Kawasaki (JP); Yoshinaka Takeda, Kawasaki (JP); Hiroaki Fujita, Kawasaki (JP); Yusuke Horii, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 442 days.

(21) Appl. No.: 12/741,387

(22) PCT Filed: Oct. 29, 2008

(86) PCT No.: PCT/JP2008/069623
§ 371 (c)(1),
(2), (4) Date: May 5, 2010

(87) PCT Pub. No.: WO2009/060765
PCT Pub. Date: May 14, 2009

(65) Prior Publication Data
US 2010/0268438 A1    Oct. 21, 2010

(30) Foreign Application Priority Data

Nov. 5, 2007  (JP) .................................. 2007-287242
Nov. 5, 2007  (JP) .................................. 2007-287243

(51) Int. Cl.
*F01N 3/00*        (2006.01)

(52) U.S. Cl. ................ 60/286; 60/280; 60/297; 60/301; 60/303; 180/65.31; 180/309; 903/904; 903/905

(58) Field of Classification Search .................... 60/280, 60/286, 297, 301, 303; 180/65.21, 65.31, 180/309; 903/903, 904, 905
See application file for complete search history.

(56) References Cited

U.S. PATENT DOCUMENTS 6,220,019 B1 * 4/2001 Sugiura et al. .................. 60/285
7,152,395 B2 * 12/2006 Inoue et al. ..................... 60/286
(Continued)

FOREIGN PATENT DOCUMENTS

JP    03-195305 A    8/1991
(Continued)

OTHER PUBLICATIONS

Japanese Office Action for corresponding JP 2007-287242, mail date Jun. 6, 2012.
(Continued)

*Primary Examiner* — Binh Q Tran
(74) *Attorney, Agent, or Firm* — Rossi, Kimma & McDowell LLP

(57) ABSTRACT

An ammonia selective reduction-type NOx catalyst (48) is interposed in an exhaust passage of an engine (2) provided in a series-type hybrid electric vehicle (1), and a urea water injector (52) is disposed in the exhaust passage to supply a urea water into exhaust gas existing upstream of the ammonia selective reduction-type NOx catalyst (48). The engine (2) is started and stopped in accordance with the storage state of a battery (8), and the urea water injector (52) is controlled in accordance with the operating state of the engine (2). When the engine (2) is to be stopped, an adsorption increasing operation for increasing the amount of ammonia adsorbed by the ammonia selective reduction-type NOx catalyst (48) is executed over a predetermined period before the engine (2) is stopped.

12 Claims, 9 Drawing Sheets

U.S. PATENT DOCUMENTS

| | | | |
|---|---|---|---|
| 7,213,397 B2* | 5/2007 | Hu et al. | 60/295 |
| 7,743,605 B2* | 6/2010 | Katou et al. | 60/287 |
| 8,096,111 B2* | 1/2012 | Hoard et al. | 60/295 |
| 2002/0052266 A1 | 5/2002 | Suzuki et al. | |
| 2005/0034450 A1 | 2/2005 | Itoh et al. | |

FOREIGN PATENT DOCUMENTS

| | | | |
|---|---|---|---|
| JP | 2002-021579 A | 1/2002 | |
| JP | 2002-201983 A | 7/2002 | |
| JP | 2005-248875 A | 9/2005 | |
| JP | 2005-264731 A | 9/2005 | |
| JP | 2006-057590 A | 3/2006 | |
| JP | 2006-219987 A | 8/2006 | |
| JP | 2006-274844 A | 10/2006 | |
| JP | 2007-239467 A | 9/2007 | |
| WO | 99/67511 A1 | 12/1999 | |

OTHER PUBLICATIONS

Japanese Office Action for corresponding JP 2007-287243, mail date Jun. 6, 2012.

Written Opinion issued in related PCT/JP2008/069623 mailed Nov. 25, 2008.

International Search Report issued in related PCT/JP2008/069623 mailed Nov. 25, 2008.

* cited by examiner

EXHAUST PURIFICATION DEVICE FOR HYBRID ELECTRIC VEHICLE

This application is a U.S. National Phase Application of PCT International Application PCT/JP2008/069623 filed on Oct. 29, 2008 which is based on and claims priority from JP 2007-287242 filed on Nov. 5, 2007 and claims priority from JP 2007-287243 filed on Nov. 5, 2007, the contents of which is incorporated herein in its entirety by reference.

TECHNICAL FIELD

The present invention relates to an exhaust purification device for use in a hybrid electric vehicle. More particularly, the invention relates to an exhaust purification device for a series-type hybrid electric vehicle wherein a generator is driven by using power from an engine which is not used for moving the vehicle, the electric power generated by the generator is stored in a battery, and an electric motor is driven by the electric power supplied from the battery and used as a power source for moving the vehicle.

BACKGROUND ART

A type of hybrid electric vehicle known as a series-type hybrid electric vehicle has been developed and put to practical use, in which a generator is driven by the power of an engine which is not used for moving the vehicle, the electric power generated by the generator is stored in a battery, and an electric motor is driven by the electric power supplied from the battery and used as a power source for moving the vehicle. In such a series-type hybrid electric vehicle, when the storage rate of the battery has become low, the engine is started to operate, and the electric power generated by the generator that is driven by the engine is stored in the battery. When the storage rate of the battery is recovered up to a predetermined storage rate by the electric power generated by the generator, the engine is stopped.

Compared with an engine used as a power source for moving a vehicle, the engine used in the series-type hybrid electric vehicle can be operated in an operation region where pollutants contained in the exhaust gas are relatively small. However, the exhaust gas from the engine still contains pollutants, and therefore, an exhaust purification device is used to purify the exhaust gas. An exhaust purification device for a hybrid electric vehicle has been proposed in Unexamined Japanese Patent Publication No. 2005-248875 (hereinafter, referred to as Patent Document 1), in which the temperature of a catalyst provided in the exhaust purification device is kept at a proper temperature to satisfactorily purify the exhaust gas.

The exhaust gas from the engine also contains NOx (nitrogen oxides) as a kind of pollutant. An exhaust purification device has been known in which an ammonia selective reduction-type NOx catalyst is disposed in the exhaust passage of the engine to reduce the NOx and thereby purify the exhaust gas. Thus, it is conceivable that such an ammonia selective reduction-type NOx catalyst may be applied to the exhaust purification device for a hybrid electric vehicle.

Where the ammonia selective reduction-type NOx catalyst is used in an exhaust purification device, generally, urea water, which is easier to handle than ammonia, is fed into the exhaust gas in order to supply ammonia as a reducing agent to the ammonia selective reduction-type NOx catalyst. In this case, the urea water is injected into the exhaust gas by using a urea-water injector or the like inserted in the exhaust passage. The urea in the atomized urea water injected into the exhaust gas from the urea-water injector is hydrolyzed by heat of the exhaust gas, and ammonia produced as a result is supplied to the ammonia selective reduction-type NOx catalyst. The ammonia is once adsorbed by the ammonia selective reduction-type NOx catalyst, and as the denitration reaction between the ammonia and the NOx in the exhaust gas is promoted by the ammonia selective reduction-type NOx catalyst, the NOx is reduced to purify the exhaust gas.

In the case of such an exhaust purification device provided with the ammonia selective reduction-type NOx catalyst, immediately after the engine is started, the temperature of the ammonia selective reduction-type NOx catalyst and of the urea-water injector is low, and thus the urea in the injected urea water cannot be satisfactorily hydrolyzed within the exhaust gas. For this reason, the injection of the urea water from the urea-water injector needs to be kept stopped until the exhaust temperature rises to a certain temperature after the start of the engine.

However, if the supply of the urea water is stopped after the start of the engine until the temperature of the ammonia selective reduction-type NOx catalyst and of the urea water injector rises to a certain level, the selective reduction of NOx by means of the ammonia selective reduction-type NOx catalyst using, as a reducing agent, the ammonia produced from the urea water is not carried out while the supply of the urea water is stopped, giving rise to a problem that the exhaust gas cannot be purified.

In the case of the series-type hybrid electric vehicle in particular, the engine is repeatedly started and stopped depending on the storage rate of the battery, as stated above. Each time the engine is started, therefore, a situation is repeated where the exhaust gas fails to be purified by selectively reducing NOx. As a result, the exhaust purification efficiency of the ammonia selective reduction-type NOx catalyst significantly lowers, posing a major problem.

DISCLOSURE OF THE INVENTION

The present invention has been made in view of the above circumstances, and an object thereof is to provide an exhaust purification device capable of improving the exhaust purification efficiency of an ammonia selective reduction-type NOx catalyst provided in a series-type hybrid electric vehicle.

To achieve the object, an exhaust purification device for a hybrid electric vehicle according to the present invention, in which a generator is driven by using power from an engine which is not used for moving the vehicle, electric power generated by the generator is stored in a battery, and an electric motor that is driven by the electric power supplied from the battery is used as a power source for moving the vehicle, comprises: an ammonia selective reduction-type NOx catalyst interposed in an exhaust passage of the engine, for selectively reducing NOx contained in exhaust gas by using ammonia as a reducing agent; a urea water supply unit for supplying urea water into the exhaust gas existing upstream of the ammonia selective reduction-type NOx catalyst; and a control unit for starting or stopping the engine in accordance with a storage state of the battery and controlling the urea water supply unit in accordance with an operating state of the engine, wherein, when the engine in operation is to be stopped, the control unit stops the engine after executing, over a predetermined period prior to stoppage of the engine, an adsorption increasing operation in which an amount of ammonia adsorbed by the ammonia selective reduction-type NOx catalyst is increased, compared with that before the predetermined period.

In the hybrid electric vehicle equipped with the exhaust purification device configured as stated above, the motive power of the engine is not used for moving the vehicle but is used to drive the generator. The engine is started or stopped by the control unit in accordance with the storage state of the battery which supplies electric power to the electric motor serving as a power source for moving the vehicle.

In the exhaust purification device, the control unit controls the urea water supply unit in accordance with the operating state of the engine, to supply the urea water from the urea water supply unit into the exhaust gas existing upstream of the ammonia selective reduction-type NOx catalyst. Urea contained in the urea water supplied from the urea water supply unit into the exhaust gas is hydrolyzed by heat of the exhaust gas, and ammonia produced as a result is supplied to the ammonia selective reduction-type NOx catalyst. The ammonia is once adsorbed by the ammonia selective reduction-type NOx catalyst, and as the denitration reaction between the ammonia and the NOx in the exhaust gas is promoted by the ammonia selective reduction-type NOx catalyst, the NOx is reduced, thereby purifying the exhaust gas.

When the engine is to be stopped, the control unit stops the engine after executing, over the predetermined period prior to stoppage of the engine, the adsorption increasing operation in which the amount of ammonia adsorbed by the ammonia selective reduction-type NOx catalyst is increased, compared with that before the predetermined period. Consequently, the engine is stopped with a large amount of ammonia adsorbed by the ammonia selective reduction-type NOx catalyst. When the engine is again started thereafter in accordance with the storage state of the battery, therefore, the NOx in the exhaust gas can be selectively reduced by a large amount of ammonia adsorbed by the ammonia selective reduction-type NOx catalyst to purify the exhaust gas, even in a situation where the urea water should not be supplied from the urea water supply unit because of the low temperature of the ammonia selective reduction-type NOx catalyst, the urea water supply unit or the like. As a result, it is possible to suppress lowering in the purification efficiency of the ammonia selective reduction-type NOx catalyst after the start of the engine.

In the exhaust purification device for a hybrid electric vehicle, the control unit may execute the adsorption increasing operation, for example, by controlling the engine such that temperature of the exhaust gas flowing into the ammonia selective reduction-type NOx catalyst is lowered, compared with that during operation of the engine and before the predetermined period.

The amount of ammonia that the ammonia selective reduction-type NOx catalyst can adsorb increases as the temperature of the ammonia selective reduction-type NOx catalyst decreases. Accordingly, by executing the adsorption increasing operation by the control unit such that the temperature of the exhaust gas flowing into the ammonia selective reduction-type NOx catalyst is lowered, compared with that before the execution of the adsorption increasing operation, it is possible to increase the amount of ammonia adsorbed by the ammonia selective reduction-type NOx catalyst.

For example, to lower the exhaust temperature, the control unit may cause revolution speed of the engine to be lowered, compared with that before the predetermined period, thereby lowering the temperature of the exhaust gas flowing into the ammonia selective reduction-type NOx catalyst. Alternatively, the control unit may cause load of the engine to be lowered, compared with that before the predetermined period, to lower the temperature of the exhaust gas flowing into the ammonia selective reduction-type NOx catalyst.

Preferably, in the exhaust purification device for a hybrid electric vehicle, while the adsorption increasing operation is executed, the control unit controls the urea water supply unit to supply a target supply amount of the urea water, which is set on the basis of an amount of ammonia consumed by reduction of the NOx by the ammonia selective reduction-type NOx catalyst and a maximum amount of ammonia that can be adsorbed by the ammonia selective reduction-type NOx catalyst.

Where the urea water supply amount is controlled in this manner, the largest possible amount of ammonia can be adsorbed by the ammonia selective reduction-type NOx catalyst during the adsorption increasing operation, without causing ammonia slip from the ammonia selective reduction-type NOx catalyst.

For example, the control unit may set, as the predetermined period, a period after the storage rate of the battery charged by operating the engine reaches a predetermined first upper-limit storage rate until the storage rate of the battery increases up to a predetermined second upper-limit storage rate higher than the first upper-limit storage rate, and stop the engine when the storage rate of the battery reaches the second upper-limit storage rate.

Where the adsorption increasing operation is executed over the thus-set period by the control unit, the ammonia selective reduction-type NOx catalyst is allowed to adsorb ammonia during the charging of the battery, in preparation for the subsequent startup of the engine. It is therefore unnecessary to operate the engine for an extra period of time to increase the ammonia adsorption amount, preventing lowering in the fuel efficiency of the engine.

Alternatively, when the battery needs to be charged, the control unit may start the engine to operate to charge the battery, then execute the adsorption increasing operation over the predetermined period after charging of the battery is completed, and subsequently stop the engine.

Where the adsorption increasing operation is executed in this manner by the control unit over the predetermined period after the charging of the battery is completed, the adsorption increasing operation can be reliably performed over the predetermined time, without being affected by the charging of the battery. As a result, the ammonia selective reduction-type NOx catalyst can adsorb ammonia with accuracy.

In the exhaust purification device for a hybrid electric vehicle, during operation of the engine, the control unit may control the engine with a control amount of the engine set to a target control amount. Preferably, in this case, after the engine is started, the control unit may cause the control amount of the engine to gradually approach the target control amount such that a rate of increase in exhaust temperature of the engine is gentler than when the control amount of the engine is immediately set to the target control amount.

The maximum amount of ammonia that can be adsorbed by the ammonia selective reduction-type NOx catalyst decreases with increase in the temperature of the ammonia selective reduction-type NOx catalyst. Thus, where the control amount of the engine is caused to gradually approach the target control amount by the control unit when the engine is started, the maximum ammonia adsorption amount of the ammonia selective reduction-type NOx catalyst moderately decreases as the exhaust temperature rises. The actual ammonia adsorption amount, which decreases due to the selective reduction of the NOx, can therefore be controlled so as not to become larger than the maximum ammonia adsorption amount, which decreases with increase in the exhaust temperature. Consequently, it is possible to reliably prevent the occurrence of ammonia slip attributable to sharp rise in the exhaust temperature at the start of the engine, so that the amount of ammonia adsorbed by the ammonia selective reduction-type NOx catalyst during the adsorption increasing operation can be increased.

In this case, the control unit may set, as the target control amount, a target revolution speed of the engine, and after the engine is started, the control unit may cause the revolution speed of the engine to gradually increase to the target revolution speed. Consequently, the exhaust temperature of the engine rises at a rate gentler than in the case where the revolution speed of the engine is immediately raised to the target revolution speed.

Alternatively, the control unit may set the target control amount equal to a control amount of the engine with which the generator generates target electric power, and after the engine is started, the control unit may vary the control amount of the engine to the target control amount such that the electric power generated by the generator gradually increases to the target electric power. As a consequence, the exhaust temperature of the engine increases at a rate gentler than in the case where the electric power generated by the generator is immediately increased to the target electric power.

The exhaust purification device may further comprise catalyst temperature detection unit for detecting temperature of the ammonia selective reduction-type NOx catalyst. In this case, after the engine is started, the control unit may cause the control amount of the engine to gradually approach the target control amount on the basis of the temperature of the ammonia selective reduction-type NOx catalyst detected by the catalyst temperature detection unit such that while the exhaust temperature of the engine is increased, the temperature of the ammonia selective reduction-type NOx catalyst is continuously controlled to a temperature at which a maximum amount of ammonia that can be adsorbed by the ammonia selective reduction-type NOx catalyst is larger than or equal to an amount of ammonia actually adsorbed by the ammonia selective reduction-type NOx catalyst.

In this case, the exhaust temperature can be gradually raised so that the maximum ammonia adsorption amount may decrease with increase in the temperature of the ammonia selective reduction-type NOx catalyst, without dropping below the amount of ammonia actually adsorbed by the ammonia selective reduction-type NOx catalyst and consumed by the selective reduction of NOx. It is therefore possible to reliably prevent the occurrence of ammonia slip at the start of the engine. Also, in this case, since the elevation of the exhaust temperature need not be delayed more than necessary, the exhaust temperature can be raised as quickly as possible to the temperature at which the urea water can be supplied.

Further, also in the case where the exhaust purification device is configured such that after the engine is started, the control unit causes the control amount of the engine to gradually approach the target control amount, the control unit may execute the adsorption increasing operation by controlling the engine such that the temperature of the exhaust gas flowing into the ammonia selective reduction-type NOx catalyst is lowered, compared with that during operation of the engine and before the predetermined period.

The amount of ammonia that the ammonia selective reduction-type NOx catalyst can adsorb increases as the temperature of the ammonia selective reduction-type NOx catalyst decreases, as mentioned above. Accordingly, by executing the adsorption increasing operation by the control unit such that the temperature of the exhaust gas flowing into the ammonia selective reduction-type NOx catalyst is lowered, compared with that before the execution of the adsorption increasing operation, it is possible to increase the amount of ammonia adsorbed by the ammonia selective reduction-type NOx catalyst.

BEST MODE OF CARRYING OUT THE INVENTION

Embodiments of the present invention will be described below with reference to the accompanying drawings.

Figure 1:
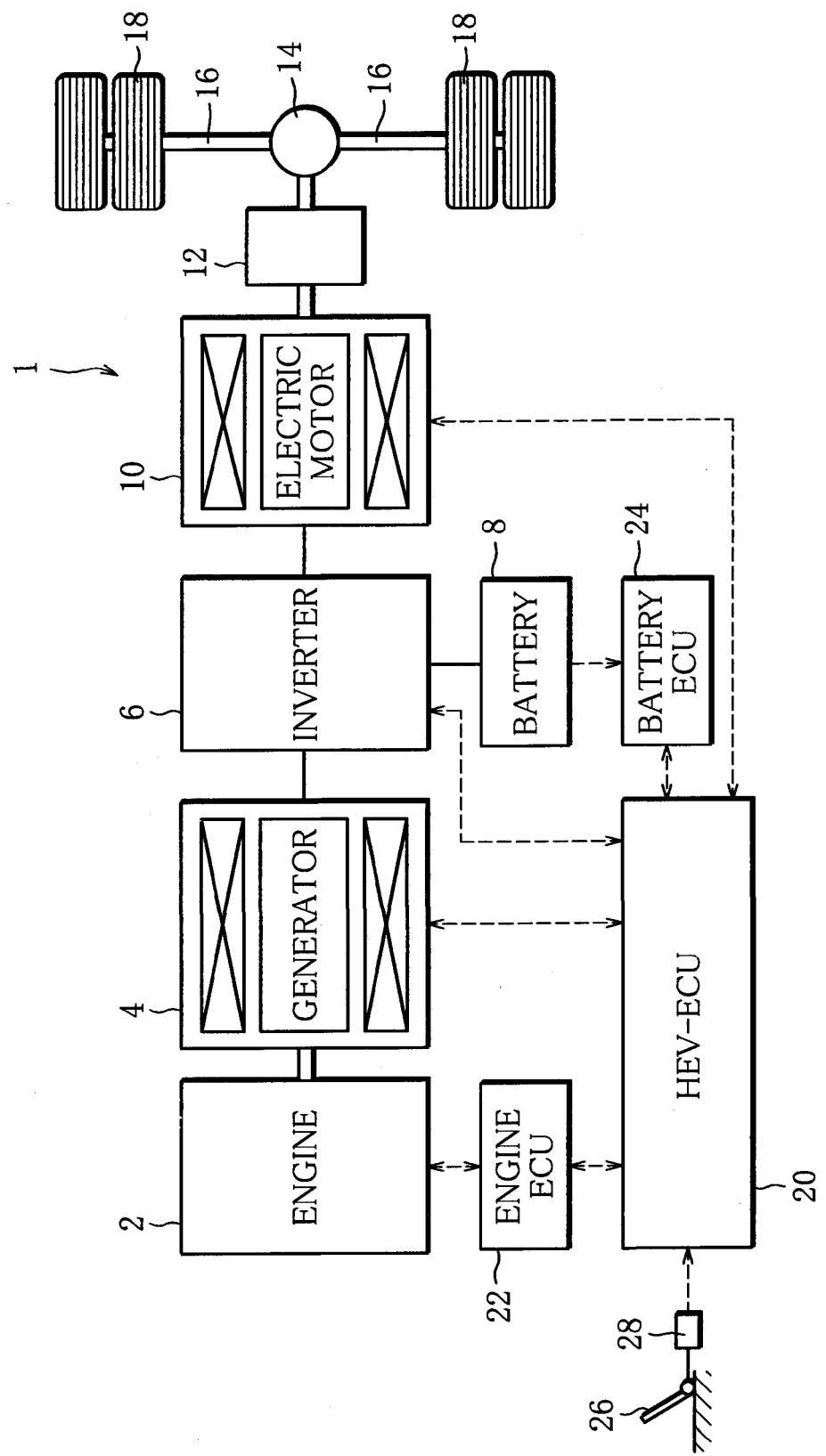
FIG. 1 illustrates an entire configuration of a hybrid electric vehicle to which is applied an exhaust purification device according to an embodiment of the present invention.

FIG. 1 illustrates an entire configuration of a series-type hybrid electric vehicle 1 to which is applied an exhaust purification device according to a first embodiment of the present invention.

A diesel engine (hereinafter, merely referred to as engine) 2 has an output shaft coupled to a rotary shaft of a generator 4. The output of the engine 2 is not used for moving the vehicle but is used to drive the generator 4. Electric power generated by the generator 4 as it is driven by the engine 2 is stored in a battery 8 through an inverter 6. The inverter 6 controls the electric current flowing between the generator 4 and the battery 8 to adjust the electric power to be generated by the generator 4 so that the battery 8 may be properly charged with the electric power supplied from the generator 4. Also, the generator 4 can be supplied with electric power from the battery 8 while the engine 2 is stopped, whereupon the generator 4 functions as an electric motor to crank the engine 2.

The hybrid electric vehicle 1 is equipped with an electric motor 10 as a power source for moving the vehicle. The output shaft of the electric motor 10 is coupled, through a reduction gear unit 12, a differential gear unit 14 and a pair of drive shafts 16, to right and left driving wheels 18. The electric motor 10 is supplied with electric power from the battery 8 through the inverter 6. The inverter 6 adjusts the electric power supplied to the electric motor 10, whereby the driving force transmitted from the electric motor 10 to the driving wheels 18 can be adjusted.

When the vehicle is braked, on the other hand, the electric motor 10 serves as a generator. At this time, the kinetic energy of the vehicle is transmitted though the driving wheels 18 to the electric motor 10 and converted to alternating-current power, so that the electric motor 10 generates regenerative braking torque. The alternating-current power is converted to direct-current power by the inverter 6 and then stored in the battery 8. Namely, at braking, the kinetic energy of the vehicle is recovered in the form of electrical energy.

An HEV-ECU (control unit) 20 collects information about operating states of the engine 2, generator 4, inverter 6, electric motor 10 and vehicle, as well as other information from an engine ECU (control unit) 22 for controlling the engine 2, and a battery ECU 24 for monitoring the status of the battery 8. Based on the collected information, the HEV-ECU 20 performs comprehensive control by sending instructions to the engine ECU 22 and the battery ECU 24 so that the engine 2, the generator 4, the inverter 6 and the electric motor 10 may operate properly.

Specifically, an accelerator position sensor 28 for detecting a depression amount of an accelerator pedal 26 is electrically connected to the HEV-ECU 20. In accordance with the depression amount of the accelerator pedal 26 detected by the accelerator position sensor 28, the HEV-ECU 20 controls the inverter 6 to adjust the driving force transmitted from the electric motor 10 to the driving wheels 18 so as to match the driver's demand. Also, when the vehicle is braked, the HEV-ECU 20 controls the inverter 6 to adjust the electric power supplied from the electric motor 10, then functioning as a generator, to the battery 8, thereby controlling the regenerative braking force generated by the electric motor 10. Further, when the battery 8 needs to be charged, the HEV-ECU 20 instructs the engine ECU 22 to start the engine 2 so that the generator 4 may be driven by the engine 2, and also controls the inverter 6 to cause the generator 4 to generate designated electric power so that the battery 8 may be properly charged.

The engine ECU 22 is provided for performing overall operation control of the engine 2. In accordance with the instructions from the HEV-ECU 20, the engine ECU 22 controls the operation of the engine 2 to drive the generator 4 so that electric power necessary for charging the battery 8 may be generated by the generator 4. As such operation control of the engine 2, the engine ECU 22 adjusts the fuel injection quantity, fuel injection timing and the like of the engine 2 and also sends to the HEV-ECU 20 various information acquired from the engine 2.

The battery ECU 24 detects the temperature and voltage of the battery 8, as well as the electric current flowing between the inverter 6 and the battery 8. Also, the battery ECU 24 obtains a storage rate SOC of the battery 8 on the basis of the detection results, and sends the storage rate SOC, along with the detection results, to the HEV-ECU 20.

In the hybrid electric vehicle 1 configured as described above, when the accelerator pedal 26 is pressed by the driver, the HEV-ECU 20 obtains a driving torque to be transmitted to the driving wheels 18 on the basis of the depression amount of the accelerator pedal 26, detected by the accelerator position sensor 28, and the running speed of the vehicle, detected by a running speed sensor (not shown). Then, the HEV-ECU 20 controls the inverter 6 to cause the electric motor 10 to generate the driving torque, so that the electric power stored in the battery 8 is supplied to the electric motor 10 through the inverter 6. The driving torque thus generated by the electric motor 10 is transmitted through the reduction gear unit 12, the differential gear unit 14 and the drive shafts 16 to the right and left driving wheels 18, with the result that the vehicle travels.

As the electric power is supplied to the electric motor 10, the storage rate of the battery 8 gradually decreases. Thus, in order to prevent the battery 8 from becoming over-discharged, the HEV-ECU 20 instructs the engine ECU 22 in accordance with the storage rate SOC of the battery 8 supplied from the battery ECU 24 such that the engine 2 is operated to drive the generator 4.

When the storage rate of the battery 8 is so low that the battery 8 needs to be charged, the engine ECU 22 starts the engine 2 in accordance with the instruction from the HEV-ECU 20, to drive the generator 4. At this time, the HEV-ECU 20 controls the inverter 6 such that a designated amount of electric power is obtained from the generator 4 at a designated revolution speed. In cooperation with this control, the engine ECU 22 controls the engine 2 such that the engine 2 is operated at a target revolution speed equal to the designated revolution speed. The designated revolution speed and the designated amount of electric power are set beforehand so that the revolution speed and load of the engine 2 may individually fall within a region where the concentration of NOx (nitrogen oxides) in the exhaust gas discharged from the engine 2 can be minimized.

Even if the operation of the engine 2 is controlled in this manner, the exhaust gas discharged from the engine 2 still contains air pollutants such as NOx and particulates. It is therefore necessary that the exhaust gas discharged from the engine 2 should be purified. In the following, the arrangement for purifying the exhaust gas discharged from the engine 2 will be described in detail with reference to FIG. 2 illustrating a system configuration of the engine 2.

Figure 2:
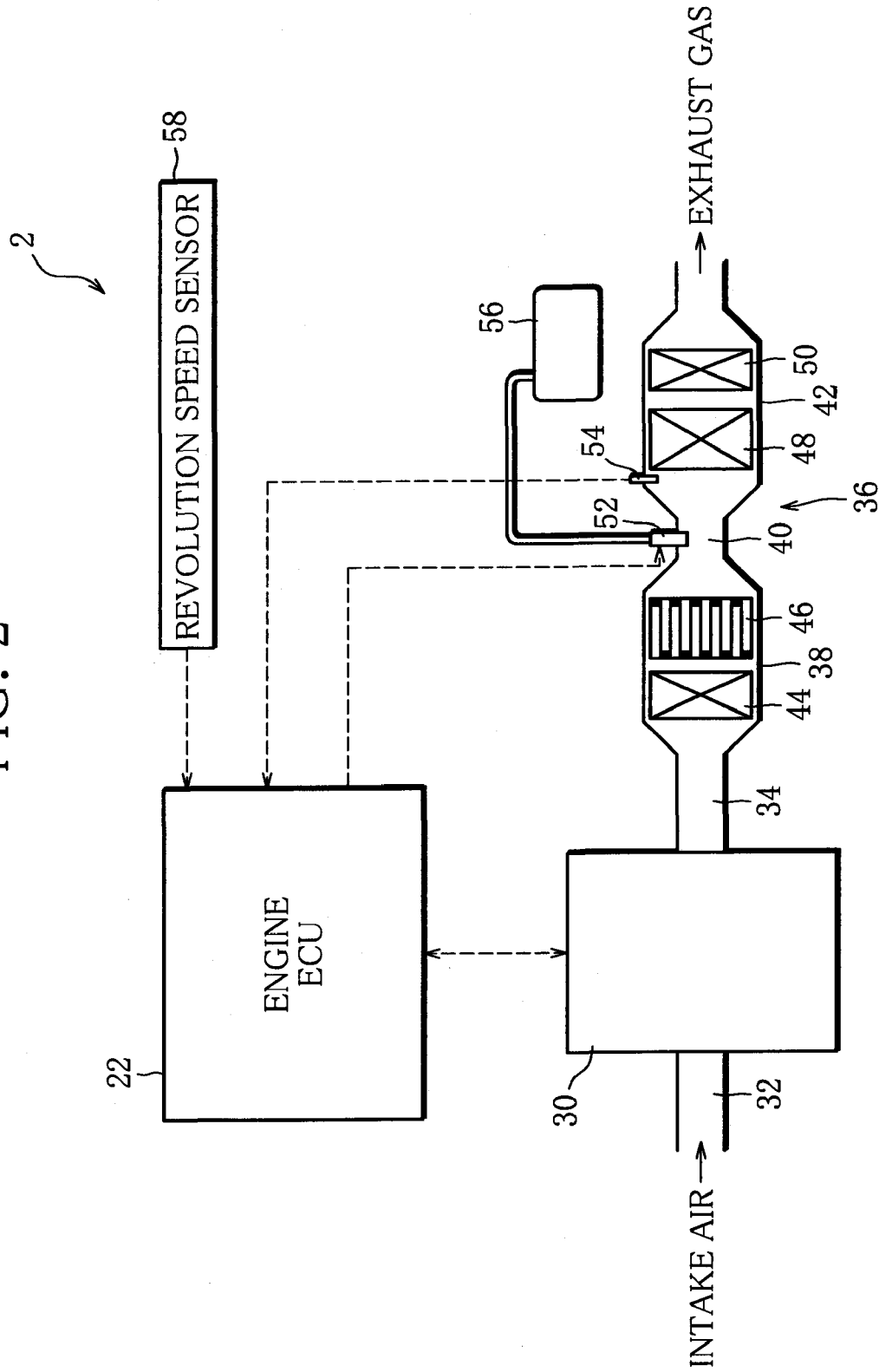
FIG. 2 illustrates a system configuration of an engine installed in the hybrid electric vehicle of FIG. 1.

As illustrated in FIG. 2, the engine 2 comprises an engine body 30 where fuel is burned in cylinders to produce a driving force for driving the generator 4, an intake pipe 32 for supplying air to the engine body 30 to burn the fuel, and an exhaust pipe (exhaust passage) 34 for discharging an exhaust gas produced as a result of the combustion of the fuel.

The exhaust pipe 34 has an exhaust aftertreatment device 36 inserted therein for purifying the exhaust gas discharged from the engine body 30. The exhaust aftertreatment device 36 comprises an upstream casing 38 and a downstream casing 42 connected to the downstream side of the upstream casing 38 by a communication passage 40. The upstream casing 38 contains a pre-stage oxidation catalyst 44, as well as a particulate filter (hereinafter, referred to as filter) 46 on the downstream side of the pre-stage oxidation catalyst 44. The filter 46 traps and collects particulates contained in the exhaust gas from the engine body 30 to purify the exhaust gas.

The pre-stage oxidation catalyst 44 oxidizes NO (nitrogen monoxide) in the exhaust gas to produce $NO_2$ (nitrogen dioxide). Since the pre-stage oxidation catalyst 44 and the filter 46 are arranged in this order, the particulates collected by and accumulated in the filter 46 react with the $NO_2$ supplied from the pre-stage oxidation catalyst 44, so that the particulates are oxidized. Accordingly, the particulates are removed from the filter 46, and the filter 46 is continuously regenerated.

On the other hand, the downstream casing 42 contains an ammonia selective reduction-type NOx catalyst (hereinafter, referred to as SCR catalyst) 48 for selectively reducing NOx in the exhaust gas by using ammonia as a reducing agent, to purify the exhaust gas. Also, a post-stage oxidation catalyst 50 for removing the ammonia flowing from the SCR catalyst 48 is contained in the downstream casing 42 on the downstream side of the SCR catalyst 48. The post-stage oxidation catalyst 50 also has the function of oxidizing CO (carbon monoxide) produced when the particulates are burned during the forced regeneration of the filter 46, the resultant $CO_2$ (carbon dioxide) being released into the atmosphere.

The communication passage 40 is provided with a urea water injector (urea water supply unit) 52 for injecting a urea water into the exhaust gas existing in the communication passage 40. The urea water is stored in a urea water tank 56 and fed to the urea water injector 52 via a urea water supply pump (not shown). The urea water injector 52 is opened and closed to inject the urea water supplied thereto into the exhaust gas existing in the communication passage 40.

Urea contained in the atomized urea water injected from the urea water injector 52 is hydrolyzed by heat of the exhaust gas, producing ammonia, which is supplied to the SCR catalyst 48. The ammonia thus supplied is once adsorbed by the SCR catalyst 48, and as the denitration reaction between the adsorbed ammonia and the NOx in the exhaust gas is promoted by the SCR catalyst 48, the NOx turns to harmless $N_2$. If, at this time, ammonia flows out of the SCR catalyst 48 without reacting with NOx, such ammonia is removed by the post-stage oxidation catalyst 50.

Further, an exhaust temperature sensor 54 for detecting the temperature of the exhaust gas is arranged upstream of the SCR catalyst 48 in the downstream casing 42. The exhaust temperature sensor 54 detects the temperature of the exhaust gas flowing into the SCR catalyst 48.

The engine ECU 22 comprises a CPU, memory chips, timer-counters and the like, in order to control the engine body 30 and the urea water injector 52 in accordance with the instructions from the HEV-ECU 20. On the basis of information from various sensors mounted on the engine body 30, such as a revolution speed sensor 58 for detecting the revolution speed of the engine body 30, the engine ECU 22 computes various control amounts such as the quantity of fuel to be supplied to the individual cylinders of the engine body 30 and the amount of the urea water to be injected from the urea water injector 52, and controls various devices in accordance with the obtained control amounts.

As stated above, the storage rate of the battery 8 lowers as the electric power is supplied to the electric motor 10, and if it is judged by the HEV-ECU 20 on the basis of the storage rate of the battery 8 detected by the battery ECU 24 that the battery 8 needs to be charged, the engine 2 configured as described above is started by the engine ECU 22. After being started, the engine 2 is controlled by the engine ECU 22 in accordance with the instructions from the HEV-ECU 20 such that the battery 8 is properly charged with the electric power generated by the generator 4.

Figure 3:
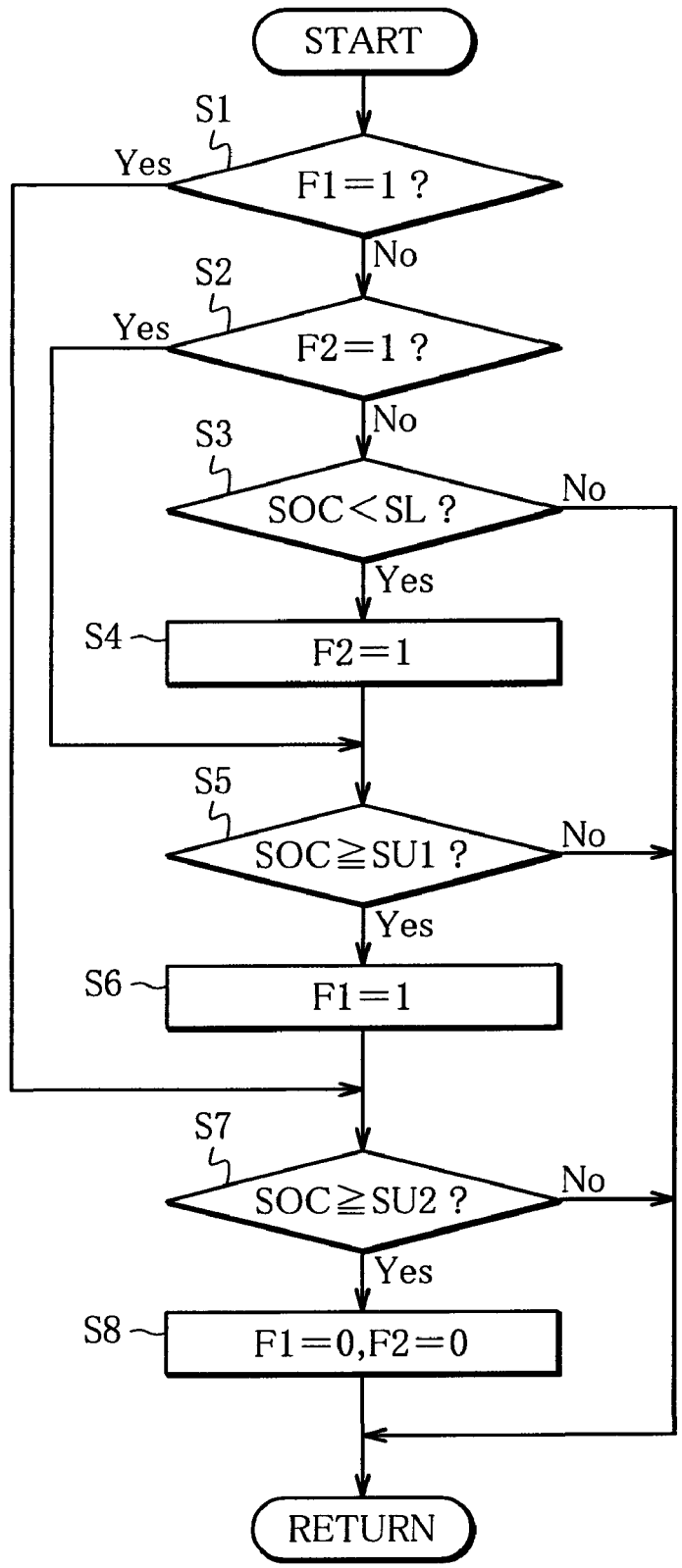
FIG. 3 is a flowchart illustrating charge control executed by an HEV-ECU.

In order to drive the generator 4 appropriately by the engine 2 and also to maintain the storage rate of the battery 8 appropriately by charging the battery 8 with the electric power generated by the generator 4, the HEV-ECU 20 repeatedly executes charge control at predetermined control intervals, in accordance with the flowchart of FIG. 3. The charge control is started when a starting switch (not shown), which is arranged in the passenger compartment of the hybrid electric vehicle 1, is operated to an ON-position, and is terminated when the starting switch is operated to an OFF-position.

When the charge control is started because the starting switch is operated to the ON-position, the HEV-ECU 20 determines first in Step S1 whether the value of a flag F1 is "1" or not.

The flag F1 is used for switching an operation mode, explained later, of the engine 2 as well as a urea water supply mode, also explained later, of the urea water injector 52. The HEV-ECU 20 sends the value of the flag F1 to the engine ECU 22 to instruct same to select the applicable engine operation mode and urea water supply mode. Specifically, the value "0" of the flag F1 specifies a first operation mode as the operation mode of the engine 2 and a first supply mode as the urea water supply mode. On the other hand, the value "1" of the flag F1 specifies a second operation mode as the operation mode of the engine 2 and a second supply mode as the urea water supply mode. In this embodiment, an operational status in which the engine 2 operates in the second operation mode and the urea water injector 52 supplies the urea water in the second supply mode corresponds to an adsorption increasing operation of the present invention. The first and second operation modes and the first and second supply modes will be described in detail later.

At the start of the charge control, the flag F1 is set to an initial value "0", and following the decision in Step S1, the HEV-ECU 20 advances the procedure to Step S2. In Step S2, the HEV-ECU 20 determines whether the value of a flag F2 is "1" or not.

The flag F2 indicates whether the battery 8 needs to be charged or not. When the storage rate of the battery 8 is so low that the battery 8 needs to be charged, it is necessary that the engine 2 should be started to be operated to drive the generator 4. Thus, by sending the value of the flag F2 to the engine ECU 22, the HEV-ECU 20 instructs the engine ECU 22 to start or stop the operation of the engine 2. Specifically, the value "0" of the flag F2 indicates that the battery 8 need not be charged, and the value "1" of the flag F2 indicates that the battery 8 needs to be charged.

When the charge control is initiated, the flag F2 is set to an initial value "0", and following the decision in Step S2, the HEV-ECU 20 advances the procedure to Step S3. In Step S3, the HEV-ECU 20 determines whether or not the storage rate SOC of the battery 8 detected by the battery ECU 24 has become lower than a predetermined lower-limit storage rate SL.

The lower-limit storage rate SL is a criterion value on the basis of which whether the battery 8 needs to be charged or not is determined. If it is judged by the HEV-ECU 20 that the storage rate SOC of the battery 8 is not lower than the lower-limit storage rate SL, then the storage rate SOC of the battery 8 has not lowered to such a level that the battery 8 needs to be charged. Accordingly, the HEV-ECU 20 ends the control procedure for the present control cycle and, in the next control cycle, starts the procedure again from Step S1.

In the next control cycle, the HEV-ECU 20 again advances the procedure to Step S3 through Steps S1 and S2, because the values of the flags F1 and F2 both remain at "0". Namely, the HEV-ECU 20 repeatedly executes the procedure from Step S1 to Step S3 through Step S2 unless and until the storage rate SOC of the battery 8 drops below the lower-limit storage rate SL. If, as a result of discharge of the battery 8, the storage rate SOC of the battery 8 becomes lower than the lower-limit storage rate SL, the HEV-ECU 20 advances the procedure to Step S4.

When the HEV-ECU 20 advances the procedure to Step S4, the storage rate SOC of the battery 8 has become lower than the lower-limit storage rate SL and thus the battery 8 needs to be charged. Accordingly, the HEV-ECU 20 sets the value of the flag F2 indicative of the need for charging to "1" and then advances the procedure to Step S5.

In Step S5, the HEV-ECU 20 determines whether or not the storage rate SOC of the battery 8 detected by the battery ECU 24 has reached a predetermined first upper-limit storage rate SU1. If the storage rate SOC of the battery 8 has not yet reached the first upper-limit storage rate SU1, the HEV-ECU 20 ends the control procedure for the present cycle and, in the next cycle, starts the procedure again from Step S1.

In the next control cycle, the HEV-ECU 20 advances the procedure to Step S5 through Steps S1 and S2, because the value of the flag F1 remains at "0" while the value of the flag F2 has been changed to "1". In Step S5, the HEV-ECU 20 again determines whether or not the storage rate SOC of the battery 8 has reached the predetermined first upper-limit storage rate SU1. Namely, the HEV-ECU 20 repeatedly executes the procedure of Steps S1, S2 and S5 unless and until the storage rate SOC of the battery 8 reaches the first upper-limit storage rate SU1 because of the charging of the battery 8.

When the value of the flag F2 is set to "1", the engine 2 is started to drive the generator 4 by engine operation control described later, so that the electric power generated by the generator 4 is charged in the battery 8. If the storage rate SOC of the battery 8 reaches the first upper-limit storage rate SU1, the HEV-ECU 20 advances the procedure to Step S6 following the decision in Step S5. In Step S6, the HEV-ECU 20 sets the value of the flag F1 to "1", and then in the next Step S7, determines whether or not the storage rate SOC of the battery 8 detected by the battery ECU 24 has reached a predetermined second upper-limit storage rate SU2. The second upper-limit storage rate SU2 is set to be higher than the first upper-limit storage rate SU1. If it is judged in Step S7 that the storage rate SOC of the battery 8 has reached the second upper-limit storage rate SU2, the HEV-ECU 20 concludes that the charging of the battery 8 has been completed. On the other hand, if the storage rate SOC of the battery 8 is still lower than the second upper-limit storage rate SU2, the HEV-ECU 20 ends the control procedure for the present cycle and, in the next control cycle, starts the procedure again from Step S1.

In the next control cycle, the HEV-ECU 20 advances the procedure from Step S1 directly to Step S7 because the value of the flag F1 has been set to "1", and again determines whether or not the storage rate SOC of the battery 8 has reached the second upper-limit storage rate SU2. Namely, the HEV-ECU 20 repeatedly executes the procedure of Steps S1 and S7 unless and until the storage rate SOC of the battery 8 being charged rises up to the second upper-limit storage rate SU2.

If the battery 8 is charged with the electric power generated by the generator 4 to such an extent that the storage rate SOC of the battery 8 reaches the second upper-limit storage rate SU2, the HEV-ECU 20 advances the procedure to Step S8 following the decision in Step S7. In Step S8, the HEV-ECU 20 resets the value of the flag F2 to "0" since the battery 8 need not be charged any longer, also resets the value of the flag F1 to "0" to prepare for the subsequent charging of the battery 8, and ends the control procedure for the present cycle. In the next and succeeding control cycles, therefore, the HEV-ECU 20 repeatedly executes the procedure from Step S1 to Step S3 through Step S2 in the aforementioned manner unless and until the storage rate SOC of the battery 8 again drops below the lower-limit storage rate SL.

The HEV-ECU 20 executes the charge control in this manner whereby, if the storage rate SOC of the battery 8 drops below the lower-limit storage rate SL, the value of the flag F2 is set to "1", whereupon the engine 2 is started by the engine operation control, described later, to drive the generator 4 and the battery 8 is charged with the electric power generated by the generator 4. While the storage rate SOC of the battery 8 remains lower than the first upper-limit storage rate SU1 thereafter, the value of the flag F1 is kept at "0", whereby the operation mode of the engine 2 and the supply mode of the urea water injector 52 are set to the first operation mode and the first supply mode, respectively, by the engine operation control and urea water supply control, explained later.

If the battery 8 is charged to an extent such that the storage rate SOC reaches the first upper-limit storage rate SU1, the value of the flag F1 is set to "1", whereby the operation mode of the engine 2 and the supply mode of the urea water injector 52 are set to the second operation mode and the second supply mode, respectively, by the engine operation control and the urea water supply control.

When the battery 8 is charged to such an extent that the storage rate SOC reaches the second upper-limit storage rate SU2, it is judged that the charging of the battery 8 has been completed. Following this decision, the engine 2 is stopped by the engine operation control, and the supply of the urea water from the urea water injector 52 is stopped by the urea water supply control.

Thus, during the period after the engine 2 is started to charge the battery 8 until the storage rate SOC reaches the first upper-limit storage rate SU1, the engine 2 is operated in the first operation mode and the urea water injector 52 is operated in the first supply mode. On the other hand, during the period after the storage rate SOC reaches the first upper-limit storage rate SU1 until the storage rate SOC increases up to the second upper-limit storage rate SU2 where the engine 2 is stopped, the engine 2 is operated in the second operation mode and the urea water injector 52 is operated in the second supply mode.

Figure 4:
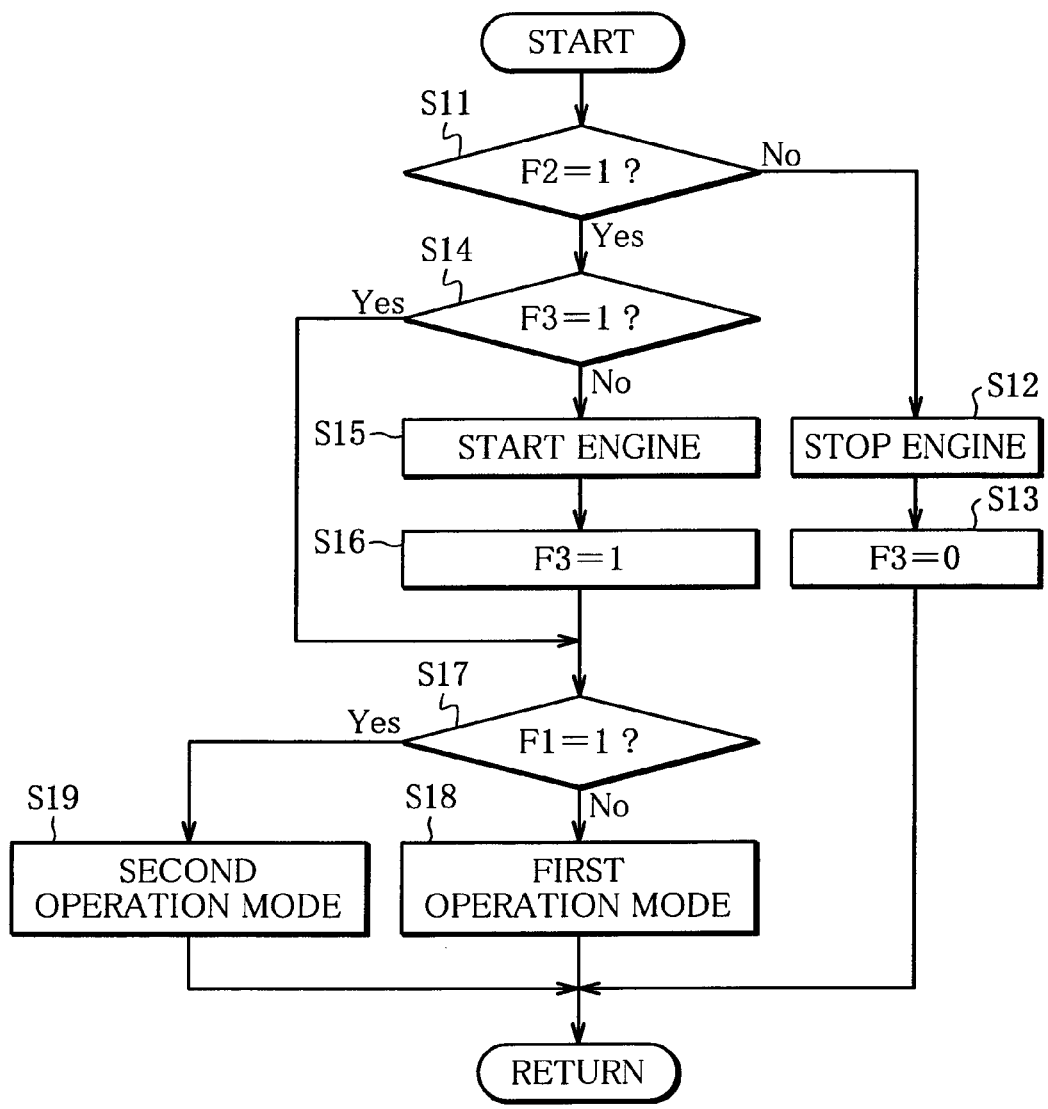
FIG. 4 is a flowchart illustrating engine operation control executed by the HEV-ECU according to a first embodiment.

The engine operation control for controlling the operation of the engine 2 in accordance with the values of the flags F1 and F2 will be now described in detail with reference to FIG. 4. Like the charge control explained above, the engine operation control is started when the starting switch is operated to the ON-position. Following the procedure illustrated in the flowchart of FIG. 4, the engine operation control is executed at the predetermined control intervals by the HEV-ECU 20 in parallel with the charge control. Also, the engine operation control is terminated when the starting switch is operated to the OFF-position, like the charge control.

In the engine operation control, the HEV-ECU 20 instructs the engine ECU 22 to start and stop the operation of the engine 2 and also to switch the operation mode in accordance with the values of the flags F1 and F2 set by the aforementioned charge control. Following the instructions, the engine ECU 22 starts or stops the operation of the engine 2 or switches the operation mode.

When the starting switch is operated to the ON-position and thus the engine operation control is initiated, the HEV-ECU 20 determines in Step S11 whether the value of the flag F2 is "1" or not. The flag F2 indicates whether the battery 8 needs to be charged or not, as stated above, and is set to the value "1" when the storage rate SOC of the battery 8 is judged to have dropped below the lower-limit storage rate SL in the charge control and thus the battery 8 needs to be charged.

Accordingly, if the storage rate SOC of the battery 8 is not lower than the lower-limit storage rate SL and the battery 8 need not be charged, that is, if the value of the flag F2 has been set to "0" by the charge control, the generator 4 need not be driven by the engine 2 to generate electric power. In this case, following the decision in Step S11, the HEV-ECU 20 advances the procedure to Step S12 and instructs the engine ECU 22 to stop the engine 2. Since the engine 2 is already at rest, the engine ECU 22 keeps the engine 2 stopped in accordance with the instruction from the HEV-ECU 20.

Then, the HEV-ECU 20 sets the value of a flag F3 to "0" in Step S13, and ends the control procedure for the present cycle. The flag F3 indicates whether or not the engine 2 is being operated. Specifically, the value "0" of the flag F3 indicates that the engine 2 is stopped, and the value "1" of the flag F3 indicates that the engine 2 is in operation.

In the next control cycle, the HEV-ECU 20 starts the procedure again from Step S11 and determines whether or not the value of the flag F2 is "1". Namely, the HEV-ECU 20 repeatedly executes the procedure from Step S11 to Step S13 through Step S12 unless and until the storage rate SOC of the battery 8 drops below the lower-limit storage rate SL and thus the value of the flag F2 is set to "1" in the charge control because of the need for charging the battery 8. Consequently, the engine 2 is kept stopped.

If the storage rate SOC of the battery 8 becomes lower than the lower-limit storage rate SL and the value of the flag F2 is set to "1" in the charge control because the battery 8 needs to be charged, the HEV-ECU 20 advances the procedure to Step S14 of the engine operation control, following the decision in Step S11, and determines whether the value of the flag F3 is "1" or not. At this time, the engine 2 is still stopped with the value of the flag F3 set to "0". Thus, following the decision in Step S14, the HEV-ECU 20 advances the procedure to Step S15.

In Step S15, the engine 2 is started. Specifically, the HEV-ECU 20 instructs the engine ECU 22 to start the engine 2 and also controls the inverter 6 so that the generator 4 may function as an electric motor. In cooperation with this, the engine ECU 22 starts the fuel supply to the engine 2 to start same in accordance with the instruction from the HEV-ECU 20. Consequently, the engine 2 is cranked by the generator 4 serving as an electric motor, and since the fuel supply to the engine 2 is initiated by the engine ECU 22, the operation of the engine 2 is started.

When the startup of the engine 2 is completed, the engine ECU 22 notifies the HEV-ECU 20 of the completion of the startup of the engine 2. On receiving the notification, the HEV-ECU 20 sends a control signal to the inverter 6 to cause the generator 4 to stop functioning as an electric motor and then advances the procedure from Step S15 to Step S16. In Step S16, the HEV-ECU 20 sets the value of the flag F3 to "1", because the engine 2 is in operation.

Subsequently, the HEV-ECU 20 advances the procedure to Step S17, where it is determined whether the value of the flag F1 is "1" or not. As mentioned above, the flag F1 is used to set the operation mode of the engine 2 and the supply mode of the urea water injector 52. Specifically, the value of the flag F1 is set to "0" by the charge control until the storage rate SOC of the battery 8 increases up to the first upper-limit storage rate SU1, and is set to "1" during the period after the storage rate SOC of the battery 8 reaches the first upper-limit storage rate SU1 until the storage rate SOC increases up to the second upper-limit storage rate SU2.

Thus, during the period after the engine 2 is started because the storage rate SOC of the battery 8 has dropped below the lower-limit storage rate SL until the storage rate SOC reaches the first upper-limit storage rate SU1, the decision that the value of the flag F1 is not "1" is made in Step S17. Accordingly, the HEV-ECU 20 advances the procedure to Step S18, where the first operation mode is selected as the operation mode of the engine 2.

When the first operation mode is selected in Step S18, the HEV-ECU 20 controls the inverter 6 so that a first target electric power may be generated at a first target revolution speed N1. The first target electric power is determined in advance such that the battery 8 is efficiently charged by the generator 4 and also that the concentration of NOx contained in the exhaust gas from the engine 2 can be reduced to the lowest possible level. Also, the HEV-ECU instructs the engine ECU 22 to operate the engine 2 in the first operation mode. In accordance with the instruction from the HEV-ECU 20, the engine ECU 22 controls the operation of the engine 2 so that the revolution speed of the engine 2 may become equal to the first target revolution speed N1.

After the first operation mode is selected in Step S18 to operate the engine 2 in the first operation mode, the HEV-ECU 20 ends the control procedure for the present cycle, and in the next cycle, the HEV-ECU 20 starts the control procedure again from Step S11. At this point of time, the storage rate SOC of the battery 8 is still low and the charging of the battery 8 is not completed yet, so that the value of the flag F2 remains at "1". Accordingly, following the decision in Step S11, the HEV-ECU 20 advances the procedure to Step S14.

In Step S14, the HEV-ECU 20 determines whether the value of the flag F3 is "1" or not, and since the engine 2 is already in operation, the flag F3 has been set to "1". Thus, following the decision in Step S14, the HEV-ECU 20 advances the procedure to Step S17 and again determines whether the value of the flag F1 is "1" or not. Namely, the HEV-ECU 20 keeps following the course from Step S17 to Step S18 until the storage rate SOC of the battery 8 being charged rises to the first upper-limit storage rate SU1. Consequently, the engine 2 is operated in the first operation mode and the generator 4 generates the first target electric power, thereby charging the battery 8.

If the storage rate SOC of the battery 8 being charged in this manner thereafter reaches the first upper-limit storage rate SU1, the value of the flag F1 is set to "1" in the charge control. Accordingly, the HEV-ECU 20 judges in Step S17 that the value of the flag F1 is "1", whereupon advancing the procedure to Step S19 in which the HEV-ECU 20 switches the operation mode of the engine 2 to the second operation mode.

When the second operation mode is selected in Step S19, the HEV-ECU 20 controls the inverter 6 so that a second target electric power may be generated at a second target revolution speed N2, and also instructs the engine ECU 22 to operate the engine 2 in the second operation mode. The second target revolution speed N2 is set to be lower than the first target revolution speed N1 which is applied when the first operation mode is selected, and also the second target electric power is set to be lower than the first target electric power which is applied when the first operation mode is selected. In accordance with the instruction from the HEV-ECU 20, the engine ECU 22 controls the operation of the engine so that the revolution speed of the engine 2 may become equal to the second target revolution speed N2. The engine 2 is therefore operated in a lower-speed, lower-load operation region than in the case of the first operation mode. As a result, the temperature of the exhaust gas discharged from the engine 2 becomes lower than in the case of the first operation mode, and the concentration of NOx contained in the exhaust gas also lowers.

After the operation mode of the engine 2 is switched to the second operation mode in Step S19, the HEV-ECU 20 ends the control procedure for the present cycle, and in the next cycle, the HEV-ECU starts the control procedure again from Step S11. At this point of time, since the charging of the battery 8 is still not completed yet, the value of the flag F2 remains at "1", and also since the engine 2 is being operated, the value of the flag F3 remains at "1". Thus, following the decisions in Steps S11 and S14, the HEV-ECU 20 advances the procedure to Step S17.

Since the value of the flag F1 has been set to "1" in the charge control, the HEV-ECU 20 advances the procedure to Step S19, following the decision in Step S17, and keeps selecting the second operation mode as the operation mode of the engine 2. Namely, the HEV-ECU 20 repeatedly advances the procedure to Step S19 during the period after the storage rate SOC of the battery 8 rises to the first upper-limit storage rate SU1 until the storage rate SOC reaches the second upper-limit storage rate SU2. As a result, the engine 2 is kept operating in the second operation mode and the generator 4 generates the second target electric power, thereby charging the battery 8.

The battery 8 is continuously charged thereafter, and if the storage rate SOC of the battery 8 reaches the second upper-limit storage rate SU2, the values of the flags F1 and F2 are both set to "0" in the charge control, as stated above. Accordingly, when the HEV-ECU 20 advances the procedure to Step S11 of the engine operation control, the HEV-ECU 20 judges that the value of the flag F2 is not "1" and then advances the procedure to Step S12.

In Step S12, the HEV-ECU 20 instructs the engine ECU 22 to stop the engine 2 and also controls the inverter 6 so as to stop the power generation by the generator 4. In accordance with the instruction from the HEV-ECU 20, the engine ECU 22 stops the operation of the engine 2 by stopping the fuel supply to the engine 2.

Since the engine 2 is stopped in Step S12, the HEV-ECU 20 resets the value of the flag F3 to "0" in Step S13, and then ends the control procedure for the present cycle. In the next and succeeding control cycles, the HEV-ECU 20 repeatedly executes the procedure from Step S11 to Step S13 through Step S12 unless and until the value of the flag F2 is set to "1" because of the need to again charge the battery 8, as stated above, with the result that the engine 2 is kept stopped.

In the engine operation control executed by the HEV-ECU 20 in the aforementioned manner, if the storage rate SOC of the battery 8 drops below the lower-limit storage rate SL, the engine 2 is started and operated in the first operation mode to drive the generator 4, and the generator 4 generates the first target electric power while rotating at the first target revolution speed N1, thereby charging the battery 8.

If the storage rate SOC of the battery 8 being charged thereafter reaches the first upper-limit storage rate SU1, the operation of the engine 2 is switched to the second operation mode. The engine 2 is kept operating in the second operation mode until the storage rate SOC of the battery 8 increases up to the second upper-limit storage rate SU2. While the engine 2 is operated in the second operation mode, the generator 4 is rotated by the engine 2 at the second target revolution speed N2 lower than the first target revolution speed N1, to generate the second target electric power smaller than the first target electric power, whereby the battery 8 is continuously charged. During this period, since the engine 2 is operated in a lower-speed, lower-load operation region than in the first operation mode, the temperature of the exhaust gas discharged from the engine 2 lowers from that in the first operation mode, and also the concentration of NOx contained in the exhaust gas decreases.

The battery 8 is continuously charged thereafter, and if the storage rate of the battery 8 reaches the second upper-limit storage rate, it is judged that the charging of the battery 8 has been completed, so that the engine 2 is stopped to terminate the power generation by the generator 4. Thus, after the storage rate SOC of the battery 8 reaches the first upper-limit storage rate SU1 and thus the operation of the engine 2 is switched to the second operation mode, the engine 2 is kept operating in the second operation mode until the storage rate SOC of the battery 8 reaches the second upper-limit storage rate SU2, where the engine is stopped.

Figure 5:
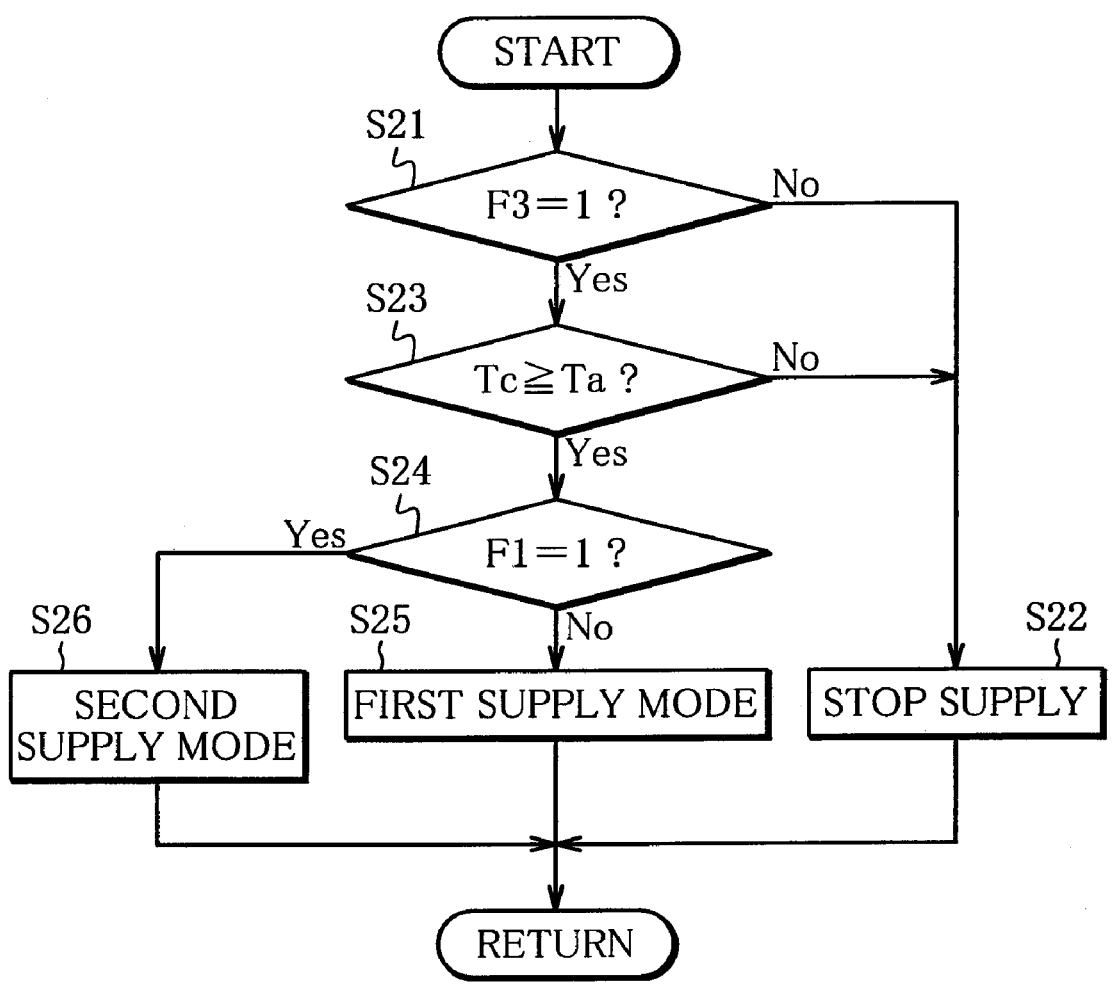
FIG. 5 is a flowchart illustrating urea water supply control executed by an engine ECU.

In accord with such operation of the engine 2, the engine ECU 22 executes the urea water supply control for supplying the urea water from the urea water injector 52 into the exhaust gas, in order to reduce the NOx in the exhaust gas discharged from the engine 2 and thereby purify the exhaust gas. Like the charge control explained above, the urea water supply control is started when the starting switch is operated to the ON-position. The urea water supply control is executed at the predetermined control intervals by the engine ECU 22, following the procedure illustrated in the flowchart of FIG. 5. Also, like the charge control, the urea water supply control is terminated when the starting switch is operated to the OFF-position.

In the urea water supply control, the engine ECU 22 controls the urea water injector 52 in accordance with the values of the flags F1 and F3 set in the charge control and instructed from the HEV-ECU 20, so as to control the supply of the urea water from the urea water injector 52 in accordance with the operating state of the engine 2 controlled by the above-described engine operation control.

When the starting switch is operated to the ON-position and thus the urea water supply control is started, the engine ECU 22 determines in Step S21 whether the value of the flag F3 is "1" or not. The flag F3 indicates whether the engine 2 is operating or not, as stated above, and when the engine 2 is in operation, the flag F3 is set to the value "1".

If the value of the flag F3 is "0" and thus the flag F3 indicates that the engine 2 is at rest, the urea water need not be injected from the urea water injector 52 into the exhaust gas discharged from the engine 2. In this case, therefore, the engine ECU 22 advances the procedure to Step S22, following the decision in Step S21, to keep the urea water supply from the urea injector 52 stopped, and then ends the control procedure for the present cycle.

In the next control cycle, the engine ECU 22 starts the procedure again from Step S21 and determines whether or not the value of the flag F3 is "1". Namely, the engine ECU 22 repeatedly executes the procedure from Step S21 to Step S22 insofar as the engine 2 remains stopped. As a result, the supply of the urea water from the urea water injector 52 is kept stopped.

If it is judged in the aforementioned charge control that the battery 8 needs to be charged, and the engine 2 is started by the engine operation control, the value of the flag F3 is set to "1". Thus, following the decision in Step S21, the engine ECU 22 advances the procedure to Step S23.

In Step S23, the engine ECU 22 determines whether or not the temperature Tc of the exhaust gas flowing into the SCR catalyst 48, detected by the exhaust temperature sensor 54, has reached a predetermined temperature Ta. The predetermined temperature Ta is set on the basis of a lower-limit temperature at which the urea contained in the urea water injected into the exhaust gas from the urea water injector 52 is hydrolyzed without hindrance and can be converted to ammonia, and is set, for example, to 200° C. If it is judged by the engine ECU 22 that the exhaust temperature Tc is still lower than the predetermined temperature Ta, the urea water should not be injected from the urea water injector 52, and therefore, the engine ECU 22 advances the procedure to Step S22. In Step S22, the engine ECU 22 keeps the urea water supply from the urea water injector 52 stopped, as stated above, and ends the control procedure for the present cycle.

In the next control cycle, the engine ECU 22 starts the procedure again from Step S21, and since the engine 2 is already in operation, the engine ECU 22 advances the procedure to Step S23 following the decision in Step S21. In Step S23, the engine ECU 22 determines whether or not the temperature Tc of the exhaust gas flowing into the SCR catalyst 48, detected by the exhaust temperature sensor 54, has reached the predetermined temperature Ta.

Thus, although the battery 8 needs to be charged and thus the engine 2 is started, the engine ECU 22 repeatedly executes the procedure from Step S21 to Step S22 through Step S23 until the temperature of the exhaust gas of the engine 2 rises to the predetermined temperature Ta. Consequently, during this period, the urea water is not injected from the urea water injector 52.

The exhaust temperature Tc keeps rising as the operation of the engine 2 is continued thereafter, and if the exhaust temperature Tc reaches the predetermined temperature Ta, the urea water is allowed to be injected from the urea water injector 52. Thus, following the decision in Step S23, the engine ECU 22 advances the procedure to Step S24 and determines whether the value of the flag F1 is "1" or not.

The flag F1 is used to set the operation mode of the engine 2 and the urea water supply mode of the urea water injector 52, as stated above. In the charge control, the value of the flag F1 is set to "0" while the storage rate SOC of the battery 8 remains lower than the first upper-limit storage rate SU1, and is set to "1" during the period after the storage rate SOC of the battery 8 reaches the first upper-limit storage rate SU1 until the storage rate SOC increases up to the second upper-limit storage rate SU2.

Accordingly, after the storage rate SOC of the battery 8 drops below the lower-limit storage rate SL and thus the engine 2 is started, during the period until the storage rate SOC of the battery 8 reaches the first upper-limit storage rate SU1 after the exhaust temperature Tc reaches the predetermined temperature Ta, the engine ECU 22 judges in Step S24 that the value of the flag F1 is not "1". Consequently, the engine ECU 22 advances the procedure to Step S25 and selects the first supply mode as the urea water supply mode.

In the first supply mode thus selected, the engine ECU 22 estimates an amount of NOx discharged per unit time from the engine 2 operated in the first operation mode, because the value of the flag F1 remains at "0" and thus the engine 2 is operated in the first operation mode. Further, the engine ECU 22 computes a target supply amount M1 of the urea water to be supplied per unit time, on the basis of an ammonia supply amount required to selectively reduce the estimated discharge amount of NOx. In accordance with the computed target supply amount M1, the engine ECU 22 controls the urea water injector 52 to supply the urea water from the urea water injector 52. The urea contained in the urea water injected from the urea water injector 52 is hydrolyzed by the heat of the exhaust gas, as mentioned above, and ammonia is produced as a result. The produced ammonia, which serves as a reducing agent, flows into the SCR catalyst 48 and reduces the NOx in the exhaust gas, whereby the exhaust gas is purified.

If the battery 8 is charged to such an extent that the storage rate SOC of the battery 8 reaches the first upper-limit storage rate SU1, the value of the flag F1 is set to "1" by the charge control. Thus, following the decision in Step S24, the engine ECU 22 advances the procedure to Step S26 and selects the second supply mode as the urea water supply mode.

At this time, the engine 2 is operated in the second operation mode because the value of the flag F1 has been set to "1". In the second operation mode, the load and revolution speed of the engine 2 are both set to be lower than in the first operation mode as stated above, and therefore, the engine 2 is operating in a lower-speed, lower-load operation region than in the case of the first operation mode. In the second supply mode, the engine ECU 22 causes the urea water injector 52 to supply the urea water in accordance with the operating state of the engine 2 such that the SCR catalyst 48 is allowed to adsorb an increased amount of ammonia produced from the urea water. Namely, while the engine 2 is operated in the second operation mode, the engine ECU 22 executes an adsorption increasing operation for increasing the amount of ammonia adsorbed by the SCR catalyst 48.

Specifically, in the second supply mode, the engine ECU 22 executes the urea water supply in the manner described below, in the adsorption increasing operation.

Figure 6:
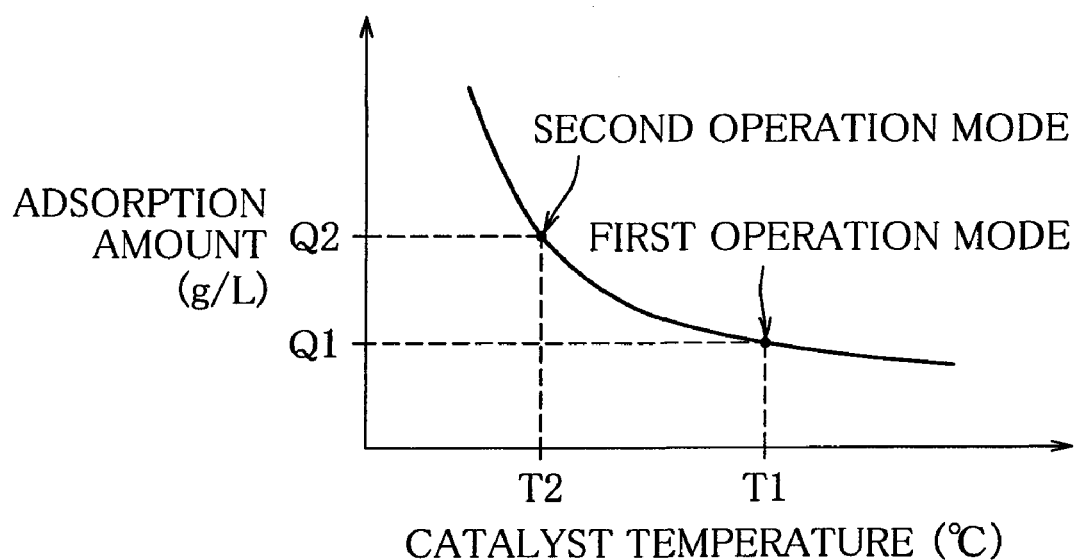
FIG. 6 is a graph illustrating the relationship between the temperature of an SCR catalyst and the amount of ammonia adsorbed by the SCR catalyst.

In the second operation mode, the engine 2 is operated in a lower-speed, lower-load operation region than in the first operation mode, and therefore, the exhaust temperature of the engine 2 is lower than that in the first operation mode and is slightly higher than the predetermined temperature Ta used in the decision of Step S23, that is, the lower-limit temperature at which the urea water is allowed to be injected from the urea water injector 52. As illustrated in FIG. 6, the maximum amount of ammonia that the SCR catalyst 48 can adsorb per unit volume shows a tendency to increase with decrease in the temperature of the SCR catalyst 48. Consequently, a maximum amount Q2 of ammonia that the SCR catalyst 48 can adsorb at a catalyst temperature T2 when the engine 2 is operated in the second operation mode is larger than a maximum amount Q1 of ammonia that the SCR catalyst 48 can adsorb at a catalyst temperature T1 when the engine 2 is operated in the first operation mode.

Namely, by switching the operation mode of the engine 2 to the second operation mode, it is possible to cause the SCR catalyst 48 to adsorb a larger amount of ammonia. Thus, in the second supply mode, the engine ECU 22 controls the supply of the urea water from the urea water injector 52 so that an increased amount of ammonia may be adsorbed by the SCR catalyst 48, because the maximum adsorption amount increases as the operation mode of the engine 2 is switched to the second operation mode.

The ammonia supplied to the SCR catalyst 48 is consumed by the selective reduction of NOx in the exhaust gas, and the remainder is left adsorbed by the SCR catalyst 48. Thus, the sum of the amount of ammonia consumed by the selective reduction of NOx and the maximum adsorption amount of the SCR catalyst 48 is a maximum supply amount of ammonia at which ammonia slip does not occur. That is, if ammonia is supplied to the SCR catalyst 48 in an amount exceeding the sum, ammonia slip occurs.

To prevent the occurrence of ammonia slip, the amount of the urea water supplied in the second supply mode is set in the manner described below.

First, based on the amount of NOx discharged per unit time from the engine 2 operated in the second operation mode, an amount of ammonia that needs to be supplied per unit time in order to selectively reduce that amount of NOx is computed, and then a urea water supply amount M2' to be supplied per unit time and corresponding to the computed ammonia supply amount is obtained.

The engine 2 is used exclusively for driving the generator 4 and is operated in the second operation mode, that is, under fixed operating conditions, after the storage rate SOC of the battery 8 reaches the first upper-limit storage rate SU1 until the storage rate SOC increase further up to the second upper-limit storage rate SU2. Accordingly, the period of time over which the engine 2 is operated in the second operation mode is almost fixed. Thus, based on the maximum ammonia adsorption amount Q2 that the SCR catalyst 48 can adsorb while the engine 2 is operated in the second operation mode, a period of time necessary for the SCR catalyst 48 to adsorb ammonia up to the maximum adsorption amount Q2 without causing ammonia slip is set as the period over which the engine 2 is operated in the second operation mode. Then, based on the urea water supply amount corresponding to the maximum adsorption amount Q2 and the period over which the engine 2 is operated in the second operation mode, a urea water supply amount M2" to be supplied per unit time and necessary to cause the SCR catalyst 48 to adsorb ammonia up to the maximum adsorption amount Q2 is obtained.

The sum of the urea water supply amounts M2' and M2" obtained in this manner is set as a second target supply amount M2 for the second supply mode and stored in the engine ECU 22.

In Step S26, the engine ECU 22 controls the urea water injector 52 in such a manner that the second target supply amount M2 of the urea water, set in the aforementioned manner, is injected into the exhaust gas. Consequently, the urea contained in the urea water injected from the urea water injector 52 is hydrolyzed to produce ammonia. Part of the produced ammonia is consumed by the selective reduction of NOx by the SCR catalyst 48, while the remaining part is adsorbed by the SCR catalyst 48.

If the storage rate SOC of the battery 8 being charged reaches the second upper-limit storage rate SU2, then it means that the charging of the battery 8 is completed. Accordingly, in the engine operation control explained above, the engine 2 is stopped and the value of the flag F3 is reset to "0". Also, in the charge control, the values of the flags F1 and F2 are both reset to "0". Thus, in the control cycle of the urea water supply control executed after the storage rate SOC of the battery 8 reaches the second upper-limit storage rate SU2, the engine ECU 22 judges in Step S21 that the value of the flag F3 is not "1", and advances the procedure to Step S22 to stop the supply of the urea water from the urea water injector 52.

In this manner, during the period after the storage rate of the battery 8 being charged with the electric power generated by the generator 4 driven by the engine 2 reaches the first upper-limit storage rate SU1 until the storage rate further increases up to the second upper-limit storage rate SU2, the engine 2 is operated in the second operation mode while the urea water is supplied from the urea water injector 52 in the second supply mode.

While the engine 2 is operated in the second operation mode, the exhaust temperature is lower than that in the first operation mode, and thus a larger amount of ammonia can be adsorbed by the SCR catalyst 48 than in the first operation mode, as stated above. Also, the second target supply amount M2 of the urea water for the second supply mode is set as the sum of the urea water supply amount M2', which corresponds to the supply amount of ammonia required to selectively reduce the NOx, and the urea water supply amount M2", which is required to allow the SCR catalyst 48 to adsorb ammonia up to the maximum adsorption amount Q2, as mentioned above. The SCR catalyst 48 can therefore be made to adsorb the largest possible amount of ammonia without causing ammonia slip from the SCR catalyst 48.

The engine 2 is used exclusively for driving the generator 4 and is operated in the second operation mode, that is, under the fixed operating condition, during the period after the storage rate SOC of the battery 8 reaches the first upper-limit storage rate SU1 until the storage rate SOC increases up to the second upper-limit storage rate SU2. Thus, as stated above, the period of time after the storage rate SOC of the battery 8 reaches the first upper-limit storage rate SU1 until the storage rate SOC increases up to the second upper-limit storage rate SU2 is almost fixed.

In the individual control cycles of the urea water supply control executed after the charging of the battery 8 is completed, the engine ECU 22 repeatedly executes the procedure from Step S21 to Step S22 until the engine 2 is again started and thus the value of the flag F3 is set to "1". Consequently, the supply of the urea water from the urea water injector 52 remains stopped.

If the storage rate SOC of the battery 8 again drops below the lower-limit storage rate SL, the engine 2 is started and the value of the flag F3 is set to "1". Thus, following the decision in Step S21, the engine ECU 22 advances the procedure to Step S23. Also in this case, the exhaust temperature of the engine 2 remains low for a while after the engine 2 is started. Accordingly, before a decision is made that the temperature Tc of the exhaust gas flowing into the SCR catalyst 48, detected by the exhaust temperature sensor 54, has reached the predetermined temperature Ta, the engine ECU 22 follows the course from Step S23 to Step S22. During this period, therefore, the urea water is not supplied from the urea water injector 52.

At this time, the engine 2 is already being operated in the first operation mode, and the exhaust gas from the engine 2 contains NOx. Since the SCR catalyst 48 carries a large amount of ammonia that was adsorbed when the battery 8 was charged the previous time, the NOx in the exhaust gas is selectively reduced by the ammonia serving as a reducing agent, whereby the exhaust gas is purified.

While the exhaust gas is purified in this manner by means of the ammonia adsorbed by the SCR catalyst 48, the exhaust temperature of the engine 2 rises. If it is judged in Step S23 by the engine ECU 22 that the exhaust temperature Tc detected by the exhaust temperature sensor 54 has reached the predetermined temperature Ta, the engine ECU 22 causes the urea water injector 52 to supply the urea water in the first supply mode, as stated above.

Accordingly, even if the engine 2 is repeatedly started and stopped to charge the battery 8, the NOx is selectively reduced by the ammonia that has already been adsorbed by the SCR catalyst 48 although the exhaust temperature remains low at the start of the engine 2. The exhaust gas from the engine 2 can therefore be satisfactorily purified from the time immediately after the start of the engine 2.

Figure 7:
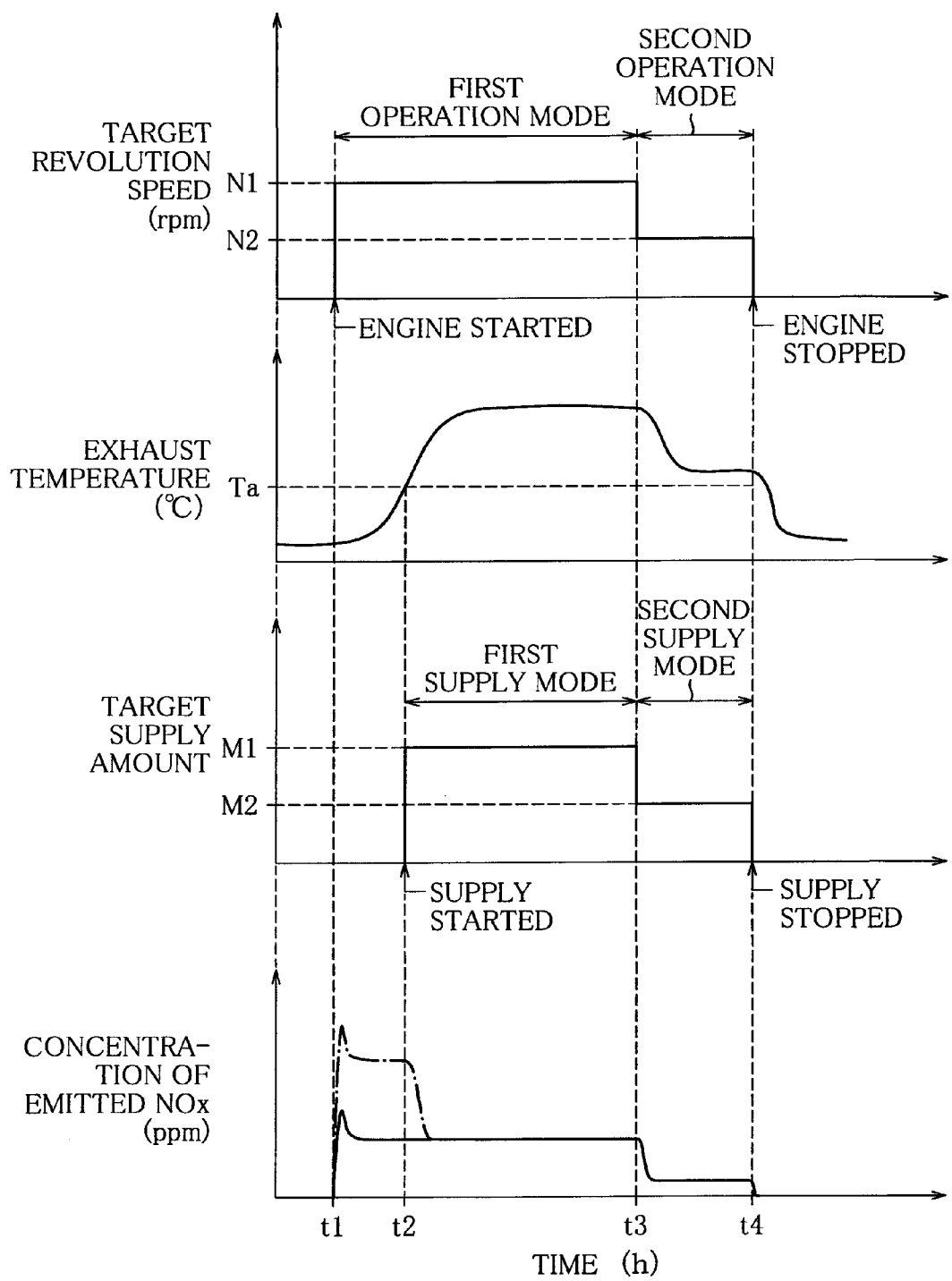
FIG. 7 is a time chart illustrating the relationship of temporal changes in various values according to the first embodiment, the values including a target engine revolution speed set by the engine operation control, the temperature of an exhaust gas flowing into the SCR catalyst, a target urea water supply amount set by the urea water supply control, and the NOx concentration of the exhaust gas emitted from an exhaust aftertreatment device.

FIG. 7 illustrates how various values change with time when the charge control and the engine operation control are executed by the HEV-ECU 20 and the urea water supply control is executed by the engine ECU 22, the values including the target revolution speed of the engine 2, the temperature of the exhaust gas flowing into the SCR catalyst 48, the target supply amount of the urea water, and the concentration of the NOx emitted from the exhaust aftertreatment device 36.

If the storage rate of the battery 8 drops below the lower-limit storage rate SL at time t1 in FIG. 7 and the engine 2 is started as a result, the engine 2 is operated in the first operation mode with the target revolution speed of the engine 2 set to the first target revolution speed N1. At this time, the generator 4 is controlled by the HEV-ECU 20 so as to generate the first target electric power at the first target revolution speed N1.

Since the engine 2 is started, the exhaust temperature of the engine 2 gradually rises, but for a while after the start of the engine 2, the exhaust temperature remains lower than the predetermined temperature Ta at which the urea water is allowed to be supplied from the urea water injector 52. Accordingly, the target supply amount of the urea water is not set with respect to the urea water injector 52, so that no urea water is supplied. Thus, where ammonia was not adsorbed by the SCR catalyst 48 while the battery 8 was charged the previous time, the exhaust gas emitted from the exhaust aftertreatment device 36 just after the start of the engine 2 is not purified and has a high concentration of NOx, as indicated by the dot-dash line in FIG. 7. According to the embodiment, by contrast, while the battery 8 was charged the previous time, a large amount of ammonia was adsorbed by the SCR catalyst 48, as stated above. Accordingly, although the urea water is not supplied from the urea water injector 52, the NOx is selectively reduced by using, as a reducing agent, the ammonia adsorbed by the SCR catalyst 48. The NOx concentration of the exhaust gas can therefore be suppressed to a low level from the start of the engine 2, as indicated by the solid line in FIG. 7, whereby lowering in the purification efficiency of the SCR catalyst 48 is prevented. The short-lasting rise in the NOx concentration just after the start of the engine 2 is attributable to incremental control of the fuel supply quantity executed at the start of the engine 2 and the activation of the SCR catalyst 48.

The exhaust temperature of the engine 2 rises thereafter as the engine 2 is kept operating in the first operation mode, and when the predetermined temperature Ta is reached at time t2, the urea water injector 52 is controlled in the first supply mode and starts to supply the target supply amount M1 of the urea water. Ammonia produced from the urea water is supplied to the SCR catalyst 48 to continue the selective reduction of the NOx, whereby the exhaust gas is purified. At this time, since the engine 2 is operated in the first operation mode to cause the generator 4 to generate the first target electric power, the exhaust temperature of the engine 2 rises to about 500° C., for example.

The battery 8 is progressively charged thereafter with the electric power generated by the generator 4 driven by the engine 2, and when the storage rate SOC of the battery 8 reaches the first upper-limit storage rate SU1 at time t3, the operation mode of the engine 2 is switched from the first operation mode to the second operation mode, in which the engine 2 is operated at the second target revolution speed N2 lower than the first target revolution speed N1. At this time, the generator 4 is controlled by the HEV-ECU 20 so as to generate the second target electric power, which is smaller than the first target electric power, at the second target revolution speed N2. Thus, the engine 2 is operated in a lower-speed, lower-load operation region than in the first operation mode, and the exhaust temperature of the engine 2 lowers to a temperature (e.g., 250° C.) slightly higher than the predetermined temperature Ta at which the water-based urea water is allowed to be supplied from the urea water injector 52.

Such decrease in the exhaust temperature permits the SCR catalyst 48 to adsorb more ammonia than when the engine 2 is operated in the first operation mode. Accordingly, when the operation mode of the engine 2 is switched to the second operation mode, the engine ECU 22 switches the urea water supply mode of the urea water injector 52 from the first supply mode to the second supply mode, in which the second target supply amount M2 is selected as the target supply amount of the urea water from the urea water injector 52.

In this embodiment, the second target supply amount M2 is smaller than the first target supply amount M1. The reason is that the concentration of the NOx discharged from the engine 2 significantly lowers because of the switchover of the operation mode of the engine 2 to the second operation mode and the consequent decrease in the exhaust temperature. Depending on the characteristics of the SCR catalyst 48 or the extent to which the exhaust temperature of the engine 2 lowers in the second operation mode, however, the second target supply amount M2 is set to be larger than the first target supply amount M1.

Since, in the second operation mode, the engine 2 is operated in a lower-speed, lower-load operation region than in the first operation mode, the NOx concentration of the exhaust gas discharged from the engine 2 is lower than that in the first operation mode, as stated above. Consequently, the NOx concentration of the exhaust gas emitted from the exhaust aftertreatment device 36 also lowers. Also, since the temperature of the SCR catalyst 48 lowers as the exhaust temperature of the engine 2 lowers, the SCR catalyst 48 adsorbs a larger amount of ammonia than when the engine 2 is operated in the first operation mode, as shown in FIG. 6.

The operation of the engine 2 in the second operation mode and the supply of the urea water in the second supply mode are continued until the storage rate SOC of the battery 8 being charged reaches the second upper-limit storage rate SU2 at time t4, and are terminated when the charging of the battery 8 is completed with its storage rate SOC increased up to the second upper-limit storage rate SU2. Thus, prior to the termination of the charging of the battery 8, the engine 2 is operated in the second operation mode and the urea water is supplied from the urea water injector 52 in the second supply mode over the predetermined period from the time t3 to t4 in FIG. 7, so that a large amount of ammonia is adsorbed by the SCR catalyst 48.

As stated above, the engine 2 is used exclusively for driving the generator 4 and is operated in the second operation mode, that is, under almost fixed operating conditions, after the storage rate SOC of the battery 8 reaches the first upper-limit storage rate SU1 until the storage rate SOC further increases up to the second upper-limit storage rate SU2. Accordingly, the period from t3 to t4 in FIG. 7 is almost fixed. By adjusting the first upper-limit storage rate SU1, therefore, it is possible to set the period over which the engine 2 is operated in the second operation mode, to a desired length so as to match the characteristics of the engine 2, the SCR catalyst 48 or the like.

In this manner, the engine 2 is operated in the second operation mode and the urea water is supplied from the urea water injector 52 in the second supply mode over the predetermined period before the engine 2 is stopped upon completion of the charging of the battery 8, whereby a large amount of ammonia is adsorbed by the SCR catalyst 48. Accordingly, when the storage rate SOC of the battery 8 again drops below the lower-limit storage rate SL and thus charging of the battery 2 is started but the urea water is not supplied from the urea water injector 52 because the exhaust temperature is low, the NOx contained in the exhaust gas is selectively reduced by the ammonia that has already been adsorbed by the SCR catalyst 48, whereby the exhaust gas can be purified.

Also, when the urea water is supplied from the urea water injector 52 in the second supply mode, the target supply amount M2 of the urea water is set to be equal to the sum of the urea water supply amount M2', which corresponds to the supply amount of ammonia necessary to selectively reduce the NOx when the engine 2 is operated in the second operation mode, and the urea water supply amount M2", which is necessary for the SCR catalyst 48 to adsorb ammonia up to the maximum adsorption amount Q2. Thus, the largest possible amount of ammonia can be adsorbed by the SCR catalyst 48 without causing ammonia slip from the SCR catalyst 48.

Further, the adsorption increasing operation for increasing the amount of ammonia adsorbed by the SCR catalyst 48 is executed while the battery 8 is charged. It is therefore unnecessary to operate the engine 2 for an extra period of time to increase the amount of ammonia adsorbed by the SCR catalyst 48, thus preventing lowering in the fuel efficiency of the engine 2.

Although the exhaust purification device for a hybrid electric vehicle according to the first embodiment of the present invention has been described above, it is to be noted that the present invention is not limited to the first embodiment alone.

Specifically, in the first embodiment, the period of the adsorption increasing operation in which the amount of ammonia adsorbed by the SCR catalyst 48 is increased by operating the engine 2 in the second operation mode and supplying the urea water in the second supply mode is set in accordance with the storage rate SOC of the battery 8. The method of setting the period of the adsorption increasing operation is, however, not limited to this alone.

For example, a timer may be used to measure the time elapsed from the time when the storage rate SOC of the battery 8 drops below the lower-limit storage rate SL and thus charging of the battery 8 is started, and when the measured time reaches a predetermined time, the adsorption increasing operation may be started. In each of the first and second operation modes, the engine 2 is operated under almost fixed conditions, and accordingly, the period elapsed from the time the charging of the battery 8 is started until the charging is completed with the storage rate SOC of the battery 8 increased up to the second upper-limit storage rate is almost fixed. Thus, the charging of the battery 8 may be started and stopped in accordance with the storage rate SOC of the battery 8, as in the above embodiment, while the timing for the switchover to the adsorption increasing operation may be determined by using the timer.

Alternatively, the operation of the engine 2 in the first operation mode and the supply of the urea water in the first supply mode may be continued until the charging of the battery 8 is completed, and the adsorption increasing operation may be executed for a predetermined period after the charging of the battery 8 is completed, by operating the engine 2 in the second operation mode and supplying the urea water in the second supply mode. In this case, while the adsorption increasing operation is executed, the HEV-ECU 20 controls the inverter 6 so that no electric power may be generated by the generator 4. Thus, the motive power of the engine 2 does not contribute to the charging of the battery 8, so that the fuel efficiency of the engine 2 lowers correspondingly. However, the time period for executing the adsorption increasing operation can be set with high precision by means of the timer.

Also, in the first embodiment, during the adsorption increasing operation, the electric power to be generated by the generator 4 is set to the second target electric power and the revolution speed is set to the second target revolution speed N2 so that the load and revolution speed of the engine 2 are both reduced to lower the exhaust temperature of the engine 2. Alternatively, only one of the load and revolution speed of the engine 2 may be decreased to lower the exhaust temperature of the engine 2.

In the first embodiment, when the urea water is injected from the urea water injector 52 in the second supply mode during the adsorption increasing operation, the target supply amount M2 of the urea water is set as the sum of the urea water supply amount M2', which corresponds to the supply amount of ammonia necessary to selectively reduce the NOx while the engine 2 is operated in the second operation mode, and the urea water supply amount M2'', which is required to allow the SCR catalyst 48 to adsorb ammonia up to the maximum adsorption amount Q2. However, the method of setting the second target supply amount of the urea water for the second supply mode is not limited to such method alone. For example, where the amount of ammonia that can be adsorbed by the SCR catalyst 48 is larger than that which is needed by the SCR catalyst 48 to selectively reduce the NOx while no urea water is supplied at the start of the engine 2, the second target supply amount may be set to be smaller than the second target supply amount determined by the aforementioned setting method.

Also, in the first embodiment, the exhaust aftertreatment device 36 is provided, in addition to the SCR catalyst 48, with the filter 46, the pre-stage oxidation catalyst 44 arranged upstream of the filter 46, and the post-stage oxidation catalyst 50 arranged downstream of the SCR catalyst 48. The other elements of the exhaust aftertreatment device than the SCR catalyst 48 and their arrangement are not limited only to the illustrated example. Namely, the elements other than the SCR catalyst 48 may be omitted as the case may be, or an additional exhaust purification device may be used in combination.

Further, although in the first embodiment, a diesel engine is used as the engine 2, the type of the engine 2 is not limited such engine alone. Namely, the present invention is equally applicable to any series-type hybrid electric vehicle that is equipped with an engine including the SCR catalyst 48 for selectively reducing the NOx in the exhaust gas by using ammonia as a reducing agent.

In the engine operation control of the first embodiment, which is executed by the HEV-ECU 20, when the engine 2 is started because the battery 8 needs to be charged, the engine 2 is operated in the first operation mode from the outset. However, the manner of operating the engine 2 when the battery 8 needs to be charged is not limited to this alone. In the following, a second embodiment in which the operation of the engine 2 is controlled in a manner different from the first embodiment will be described in detail with reference to the drawings.

The second embodiment differs from the first embodiment only in the engine operation control executed by the HEV-ECU 20. Namely, the entire configuration of a hybrid electric vehicle to which an exhaust purification device of the second embodiment is applied is identical with that of the first embodiment illustrated in FIG. 1, and also the system configuration of an engine used in the second embodiment is identical with that of the first embodiment illustrated in FIG. 2. In the following, therefore, identical reference signs are used to denote elements identical with those of the first embodiment, and description of such elements is omitted. Thus, the following description is focused on the differences between the first and second embodiments.

As mentioned above, the second embodiment differs from the first embodiment only in the engine operation control executed by the HEV-ECU 20, and the charge control executed by the HEV-ECU 20 is identical with that of the first embodiment. Specifically, also in the second embodiment, the HEV-ECU 20 executes the charge control following the procedure illustrated in the flowchart of FIG. 3, to set the values of the flags F1 and F2 for determining the operation mode of the engine 2 and the urea water supply mode.

Accordingly, while the storage rate SOC of the battery 8 is within a proper range, the values of the flags F1 and F2 are both "0", and if the storage rate SOC of the battery 8 drops below the lower-limit storage rate SL, the value of the flag F2 is changed to "1", as in the charge control of the first embodiment. Subsequently, the engine 2 is started to drive the generator 4, and the battery 8 is charged with the electric power generated by the generator 4. If the storage rate SOC of the battery 8 reaches the first upper-limit storage rate SU1, the value of the flag F1 is changed to "1", and if the storage rate SOC of the batter 8 further increases up to the second upper-limit storage rate SU2, it is judged that the charging of the battery 8 is completed, and the values of the flags F1 and F2 are both changed to "0".

In accordance with the values of the flags F1 and F2 set in this manner, the engine operation control of the second embodiment is executed by the HEV-ECU 20 in a manner different from that of the first embodiment.

Figure 8:
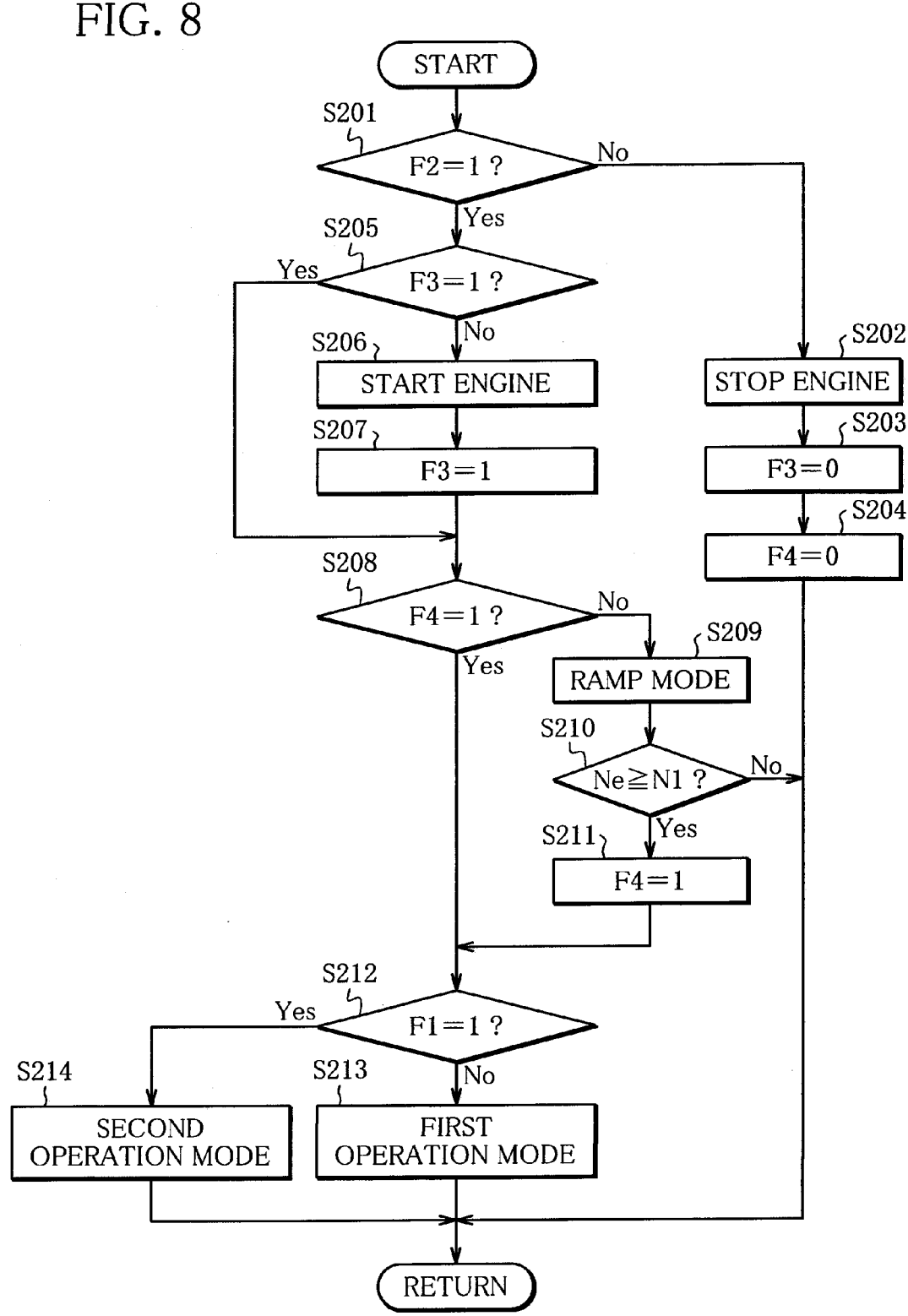
FIG. 8 is a flowchart illustrating engine operation control executed by the HEV-ECU according to a second embodiment.

Also in the second embodiment, the engine operation control is started when the starting switch is operated to the ON-position, as in the charge control. Following the procedure illustrated in the flowchart of FIG. 8, the HEV-ECU 20 executes the engine operation control at the predetermined control intervals in parallel with the charge control. Further, the engine operation control is terminated when the starting switch is operated to the OFF-position, as in the charge control.

In the engine operation control, the HEV-ECU 20 instructs the engine ECU 22 to start and stop the operation of the engine 2 and also to switch the operation mode during the operation of the engine 2 in accordance with the values of the flags F1 and F2 set by the charge control. Following the instructions, the engine ECU 22 starts or stops the operation of the engine 2 and switches the operation mode.

When the starting switch is operated to the ON-position and thus the engine operation control is initiated, the HEV-ECU 20 determines in Step S201 whether or not the value of the flag F2 is "1". The flag F2 indicates whether the battery 8 needs to be charged or not, as in the first embodiment. As stated above, the value of the flag F2 is set to "1" in the charge control when the storage rate SOC of the battery 8 is judged to have dropped below the lower-limit storage rate SL and thus the battery 8 needs to be charged.

Accordingly, if the storage rate SOC of the battery 8 is not lower than the lower-limit storage rate SL and the battery 8 need not be charged, that is, if the value of the flag F2 has been set to "0" by the charge control, the generator 4 need not be driven by the engine 2 to generate electric power. In this case, following the decision in Step S201, the HEV-ECU 20 advances the procedure to Step S202 and instructs the engine ECU 22 to stop the engine 2. Since the engine 2 is already at rest, the engine ECU 22 keeps the engine 2 stopped in accordance with the instruction from the HEV-ECU 20.

Then, the HEV-ECU 20 sets the value of the flag F3 to "0" in Step S203, and sets the value of a flag F4 to "0" in Step S204, followed by ending the control procedure for the present cycle. The flag F3 indicates whether or not the engine 2 is being operated, as in the first embodiment. Specifically, the value "0" of the flag F3 indicates that the engine 2 is at rest, and the value "1" of the flag F3 indicates that the engine 2 is in operation. The flag F4 indicates whether a ramp-mode operation of the engine 2, described later, is completed or not. Specifically, the value "1" of the flag F4 indicates that the ramp-mode operation is completed.

In the next control cycle, the HEV-ECU 20 starts the procedure again from Step S201 and determines whether or not the value of the flag F2 is "1". Namely, the HEV-ECU 20 repeatedly executes the procedure from Step S201 to Step S204 through Steps S202 and S203 at the control intervals unless and until the storage rate SOC of the battery 8 drops below the lower-limit storage rate SL and thus the value of the flag F2 is set to "1" in the charge control because of the need to charge the battery 8. Consequently, the engine 2 is kept stopped.

If the storage rate SOC of the battery 8 becomes lower than the lower-limit storage rate SL and the value of the flag F2 is set to "1" in the charge control because the battery 8 needs to be charged, the HEV-ECU 20 advances the procedure to Step S205 of the engine operation control, following the decision in Step S201, and determines whether the value of the flag F3 is "1" or not. At this time, the engine 2 is still stopped with the value of the flag F3 set to "0". Thus, following the decision in Step S205, the HEV-ECU 20 advances the procedure to Step S206.

In Step S206, the engine 2 is started. Specifically, the HEV-ECU 20 instructs the engine ECU 22 to start the engine 2 and also controls the inverter 6 so that the generator 4 may function as an electric motor. In accordance with the instruction from the HEV-ECU 20, the engine ECU 22 starts the fuel supply to the engine 2 to start same. Consequently, the engine 2 is cranked by the generator 4 serving as an electric motor, and since the fuel supply to the engine 2 is initiated by the engine ECU 22, the operation of the engine 2 is started.

When the startup of the engine 2 is completed, the engine ECU 22 notifies the HEV-ECU 20 of the completion of the startup of the engine 2. On receiving the notification, the HEV-ECU 20 sends a control signal to the inverter 6 to cause the generator 4 to stop functioning as an electric motor, and then advances the procedure from Step S206 to Step S207. In Step S207, the HEV-ECU 20 sets the value of the flag F3 to "1", because the engine 2 is in operation.

Subsequently, the HEV-ECU 20 advances the procedure to Step S208 and determines whether the value of the flag F4 is "1" or not. As stated above, the flag F4 indicates whether or not the engine 2 has completed the ramp-mode operation. When the engine operation control is started, the engine 2 is at rest, and therefore, the flag F4 is set to an initial value "0".

Then, following the decision in Step S208, the HEV-ECU 20 advances the procedure to Step S209, wherein the HEV-ECU 20 instructs the engine ECU 22 to operate the engine 2 in a ramp mode and also controls the inverter 6 so that the electric power generated by the generator 4 may be varied so as to match the ramp-mode operation of the engine 2.

In the ramp mode, the engine 2 is controlled in such a manner that the revolution speed (control amount) of the engine 2 gradually rises from an idling speed just after the startup to the first target revolution speed (target control amount) N1 of the first operation mode. In accord with such engine speed control, the electric power generated by the generator 4 gradually increases from "0" (watt) to the first target electric power corresponding to the first operation mode. As the generated electric power varies in this manner, the load (control amount) of the engine 2 also gradually increases up to the load (target control amount) where the engine 2 is operated in the first operation mode and the generator 4 generates the first target electric power corresponding to the first operation mode. To allow the revolution speed to increase and also to cope with increase in the load, the engine ECU 22 gradually increases the quantity of fuel supplied to the engine 2.

Like the first embodiment, the first target electric power is determined in advance as such an electric power that while the engine 2 is operated in the first operation mode, the battery 8 is efficiently charged by the generator 4 rotated at the first target revolution speed and also the concentration of NOx contained in the exhaust gas from the engine 2 is reduced to the lowest possible level. Also, the rate of change of the revolution speed of the engine 2 and that of the electric power generated by the generator 4 in the ramp mode are individually determined beforehand such that the electric power generated by the generator 4 reaches the first target electric power when the revolution speed of the engine 2 reaches the first target revolution speed.

Thus, while the procedure in Step S209 is repeatedly executed at the control intervals, the engine ECU 22 controls the engine 2 in accordance with the instruction from the HEV-ECU 20 such that the engine 2 is continuously operated in the ramp mode. As a result, the revolution speed of the engine 2 gradually rises from the idling speed to the first target revolution speed N1 while the electric power generated by the generator 4 also gradually increases to the first target electric power, so that the load of the engine 2 gradually increases.

Subsequently, the HEV-ECU 20 advances the procedure to Step S210 and determines whether or not the revolution speed Ne of the engine 2, detected by the revolution speed sensor 58, has reached the first target revolution speed N1. If the revolution speed Ne of the engine 2 is still lower than the first target revolution speed N1, the HEV-ECU 20 ends the control procedure for the present cycle, after the determination in Step S210. In the next control cycle, the HEV-ECU 20 starts the procedure again from Step S201.

If, in the next control cycle, the storage rate SOC of the battery 8 is still low and the charging of the battery 8 is not completed yet, the value of the flag F2 remains at "1". Thus, following the decision in Step S201, the HEV-ECU 20 advances the procedure to Step S205. In Step S205, the HEV-ECU 20 determines whether or not the value of the flag F3 is "1". At this time, the engine 2 is already in operation and the flag F3 has been set to "1". Thus, following the decision in Step S205, the HEV-ECU 20 advances the procedure to Step S208 and again determines whether the value of the flag F4 is "1" or not.

If the ramp-mode operation of the engine 2 is not completed yet at this point of time, the value of the flag F4 remains at "0". In this case, the HEV-ECU 20 advances the procedure to Step S209, following the decision in Step S208. In Step S209, the HEV-ECU 20 again instructs the engine ECU 22 to operate the engine 2 in the ramp mode in the aforementioned manner, and causes the electric power generated by the generator 4 to gradually increase. Namely, the HEV-ECU 20 repeatedly executes the procedure in Steps S201, S205, S208 and S209 in this order after the ramp-mode operation of the engine 2 is started until the revolution speed Ne of the engine 2 reaches the first target revolution speed N1. Consequently, the engine 2 is continuously operated in the ramp mode.

In this manner, the engine 2 is operated in the ramp mode until the revolution speed Ne of the engine 2 reaches the first target revolution speed N1, and also the electric power generated by the generator 4 is gradually increased from "0" to the first target electric power so as to keep pace with the engine control. Thus, compared with the case where the revolution speed of the engine 2 is raised to the first target revolution speed N1 immediately after the startup and also the electric power generated by the generator 4 is increased to the first target electric power immediately after the startup, the rate of increase in the exhaust temperature of the engine 2 is moderate. The rate of increase of the engine revolution speed and that of the electric power generated by the generator 4 while the engine 2 is operated in the ramp mode are determined in advance so that the exhaust temperature may rise at a predetermined rate, as described later.

The engine 2 is thus operated in the ramp mode, and if the revolution speed Ne of the engine 2 increases up to the first target revolution speed N1, the HEV-ECU 20 advances the procedure from Step S210 to Step S211, where the value of the flag F4 is set to "1".

Subsequently, the HEV-ECU 20 advances the procedure to Step S212 and determines whether or not the value of the flag F1 is "1". As stated above, the flag F1 is used to set the operation mode of the engine 2 and the urea water supply mode of the urea water injector 52. Specifically, the value of the flag F1 is set to "0" by the charge control until the storage rate SOC of the battery 8 increases up to the first upper-limit storage rate SU1, and is set to "1" during the period after the storage rate SOC of the battery 8 reaches the first upper-limit storage rate SU1 until the storage rate SOC increases up to the second upper-limit storage rate SU2.

Thus, while the storage rate SOC of the battery 8 remains below the first upper-limit storage rate SU1, the decision that the value of the flag F1 is not "1" is made in Step S212. Accordingly, the HEV-ECU 20 advances the procedure to Step S213, where the first operation mode is selected as the operation mode of the engine 2.

When the first operation mode is selected in Step S213, the HEV-ECU 20 controls the inverter 6 so that the electric power generated by the generator 4 may become equal to the first target electric power at the first target revolution speed N1, and also instructs the engine ECU 22 to operate the engine 2 in the first operation mode. In accordance with the instruction from the HEV-ECU 20, the engine ECU 22 controls the operation of the engine 2 so that the revolution speed of the engine 2 may become equal to the first target revolution speed N1. Because of the ramp-mode operation described above, the revolution speed of the engine 2 has already reached the first target revolution speed N1 and also the electric power generated by the generator 4 has already increased to the first target electric power. Accordingly, the operation of the engine 2 smoothly switches from the ramp mode to the first operation mode.

After the first operation mode is selected in Step S213 to operate the engine 2 in the first operation mode, the HEV-ECU 20 ends the control procedure for the present cycle, and in the next cycle, the HEV-ECU 20 starts the control procedure again from Step S201. If, at this point of time, the storage rate SOC of the battery 8 is still low and the charging of the battery 8 is not completed yet, the HEV-ECU 20 advances the procedure from Step S201 to Step S208 through Step S205, and again determines whether the value of the flag F4 is "1" or not.

Since the ramp-mode operation of the engine 2 is already completed, the flag F4 has been set to "1". Thus, following the decision in Step S208, the HEV-ECU 20 advances the procedure to Step S212 and again determines whether or not the value of the flag F1 is "1". Namely, the HEV-ECU 20 keeps following the course from Step S212 to Step S213 during the period after the operation mode of the engine 2 is switched from the ramp mode to the first operation mode until the storage rate SOC of the battery 8 being charged rises to the first upper-limit storage rate SU1. Consequently, the engine 2 is operated in the first operation mode and the generator 4 generates the first target electric power, thereby charging the battery 8.

If the storage rate SOC of the battery 8 being charged thereafter reaches the first upper-limit storage rate SU1, the value of the flag F1 is set to "1" in the charge control. Accordingly, the HEV-ECU 20 judges in Step S212 that the value of the flag F1 is "1", and advances the procedure to Step S214, in which the HEV-ECU 20 switches the operation mode of the engine 2 to the second operation mode.

When the second operation mode is selected in Step S214, the HEV-ECU 20 controls the inverter 6 so that the second target electric power may be generated at the second target revolution speed N2, and also instructs the engine ECU 22 to operate the engine 2 in the second operation mode. The second target revolution speed N2 is set to be lower than the first target revolution speed N2 which is applied while the first operation mode is selected, and the second target electric power is set to be lower than the first target electric power which is applied while the first operation mode is selected. In accordance with the instruction from the HEV-ECU 20, the engine ECU 22 controls the operation of the engine so that the revolution speed of the engine 2 may become equal to the second target revolution speed N2. The engine 2 is therefore operated in a lower-speed, lower-load operation region than in the case of the first operation mode. As a result, the temperature of the exhaust gas discharged from the engine 2 becomes lower than that in the first operation mode, and the concentration of the NOx contained in the exhaust gas also lowers.

After the operation mode of the engine 2 is switched to the second operation mode in Step S214, the HEV-ECU 20 ends the control procedure for the present cycle, and in the next cycle, the HEV-ECU starts the control procedure again from Step S201. If, at this point of time, the charging of the battery 8 is still not completed yet, the value of the flag F2 remains at "1", and since the engine 2 is being operated, the value of the flag F3 remains at "1". Further, since the ramp-mode operation of the engine 2 is completed, the value of the flag F4 has been set to "1". Thus, following the decisions in Steps S201, S205 and S208, the HEV-ECU 20 advances the procedure to Step S212.

Since the value of the flag F1 has been set to "1" in the charge control, the HEV-ECU 20 advances the procedure to Step S214, following the decision in Step S212, and keeps selecting the second operation mode as the operation mode of the engine 2. Namely, during the period after the storage rate SOC of the battery 8 rises to the first upper-limit storage rate SU1 until the storage rate SOC reaches the second upper-limit storage rate SU2, the HEV-ECU 20 repeatedly advances the procedure to Step S214. Consequently, the engine 2 is operated in the second operation mode and the generator 4 generates the second target electric power, thereby charging the battery 8.

The battery 8 is continuously charged thereafter, and if the storage rate SOC of the battery 8 reaches the second upper-limit storage rate SU2, the values of the flags F1 and F2 are both set to "0" in the charge control, as stated above. Accordingly, when the HEV-ECU 20 executes the procedure in Step S201 of the engine operation control, the HEV-ECU 20 judges that the value of the flag F2 is not "1", and advances the procedure to Step S202.

In Step S202, the HEV-ECU 20 instructs the engine ECU 22 to stop the engine 2 and also controls the inverter 6 so as to stop the power generation by the generator 4. In accordance with the instruction from the HEV-ECU 20, the engine ECU 22 stops the operation of the engine 2 by stopping the fuel supply to the engine 2.

Since the engine 2 is stopped in Step S202, the HEV-ECU 20 resets the value of the flag F3 to "0" in Step S203, then resets the value of the flag F4 to "0" in Step S204, and ends the control procedure for the present cycle. In the next and succeeding control cycles, the HEV-ECU 20 repeatedly executes the procedure from Step S201 to Step S204 through Steps S202 and 203 unless and until the value of the flag F2 is set to "1" because the battery 8 needs to be again charged, as stated above, with the result that the engine 2 is kept stopped.

In the engine operation control executed by the HEV-ECU 20 in the aforementioned manner, if the storage rate SOC of the battery 8 drops below the lower-limit storage rate SL, the engine 2 is started and operated in the ramp mode. In the ramp mode, the revolution speed of the engine 2 gradually rises from the idling speed to the first target revolution speed. As the revolution speed rises, the electric power generated by the generator 4 gradually increases from "0" to the first target electric power, so that the load of the engine 2 gradually increases. As a result, the exhaust temperature of the engine 2 rises more gently than in the case where the revolution speed of the engine 2 and the electric power generated by the generator 4 are raised to the first target revolution speed N1 and the first target electric power, respectively, immediately after the engine 2 is started.

When the revolution speed of the engine 2 reaches the first target revolution speed N1, the electric power generated by the generator 4 also reaches the first target electric power, and therefore, the operation of the engine 2 smoothly switches to the first operation mode. Then, the engine 2 is operated in the first operation mode to drive the generator 4, and the generator 4 generates the first target electric power to continue charging the battery 8 while rotating at the first target revolution speed.

If the storage rate SOC of the battery 8 being charged thereafter reaches the first upper-limit storage rate SU1, the operation of the engine 2 is switched to the second operation mode. The engine 2 is kept operating in the second operation mode until the storage rate SOC of the battery 8 increases up to the second upper-limit storage rate SU2. While the engine 2 is operated in the second operation mode, the generator 4 is rotated by the engine 2 at the second target revolution speed N2 lower than the first target revolution speed N1, to generate the second target electric power smaller than the first target electric power, whereby the battery 8 is continuously charged. During this period, since the engine 2 is operated in a lower-speed, lower-load operation region than in the case of the first operation mode, the temperature of the exhaust gas discharged from the engine 2 is lower than that in the first operation mode and also the concentration of the NOx contained in the exhaust gas lowers.

The battery 8 is continuously charged thereafter, and if the storage rate of the battery 8 reaches the second upper-limit storage rate, it is judged that the charging of the battery 8 has been completed, so that the engine 2 is stopped to terminate the power generation by the generator 4. Thus, after the storage rate SOC of the battery 8 reaches the first upper-limit storage rate SU1 and thus the operation of the engine 2 is switched to the second operation mode, the engine 2 is kept operating in the second operation mode until the storage rate SOC of the battery 8 reaches the second upper-limit storage rate SU2 and the engine is stopped.

In this manner, the engine operation control of this embodiment differs from that of the first embodiment in that, when the engine 2 is started because of the need to charge the battery 8, the engine is not immediately operated in the first operation mode, but is operated in the ramp mode. In this embodiment, after the operation of the engine 2 is switched from the ramp mode, which is applied following the startup, to the first operation mode, the engine is controlled in the same manner as in the engine operation control of the first embodiment.

Also in this embodiment, the engine ECU 22 executes the urea water supply control for supplying the urea water from the urea water injector 52 into the exhaust gas, in a manner coordinated with the operation of the engine 2, so as to reduce the NOx contained in the exhaust gas discharged from the engine 2 and thereby purify the exhaust gas. The urea water supply control is executed following the procedure illustrated in the flowchart of FIG. 5, like the urea water supply control executed by the engine ECU 22 in the first embodiment. Specifically, the engine ECU 22 starts the urea water supply control when the starting switch is operated to the ON-position, like the charge control, and executes the urea water supply control at the predetermined control intervals. Also, the engine ECU 22 terminates the urea water supply control when the starting switch is operated to the OFF-position, like the charge control.

The urea water supply control itself is identical with that of the first embodiment as stated above. In the following, therefore, the urea water supply control will be briefly explained.

If the battery 8 need not be charged and thus the engine 2 is stopped, the engine ECU 22 stops the supply of the urea water from the urea water injector 52. When the engine 2 is started because the battery 8 needs to be charged, the engine ECU 22 keeps the urea water supply of the urea water injector 52 stopped because the urea water should not be injected from the urea water injector 52 until the temperature Tc of the exhaust gas flowing into the SCR catalyst 48, detected by the exhaust temperature sensor 54, reaches the predetermined temperature Ta.

The exhaust temperature Tc rises as the engine 2 is continuously operated, and if the exhaust temperature Tc reaches the predetermined temperature Ta, the urea water is supplied from the urea water injector 52 in the first supply mode. The engine ECU 22 maintains the urea water supply in the first supply mode until the storage rate SOC of the battery 8 reaches the first upper-limit storage rate SU1.

In the first supply mode, the engine ECU 22 estimates the amount of NOx discharged per unit time from the engine 2, in accordance with the operating state of the engine 2, and obtains a target supply amount of the urea water to be supplied per unit time, on the basis of the ammonia supply amount required to selectively reduce the estimated discharge amount of NOx, as in the first embodiment. Usually, however, the exhaust temperature Tc reaches the predetermined temperature Ta after the ramp-mode operation of the engine 2 is completed. Thus, in the first supply mode, the engine ECU 22 estimates the amount of NOx discharged per unit time from the engine 2 operated in the first operation mode, and obtains the target supply amount M1 of the urea water to be supplied per unit time, based on the ammonia supply amount necessary to selectively reduce the estimated discharge amount of NOx. In accordance with the target supply amount M1 thus obtained, the engine ECU 22 controls the urea water injector 52 to supply the urea water.

During the period after the storage rate SOC of the battery 8 reaches the first upper-limit storage rate SU1 until the storage rate SOC increases up to the second upper-limit storage rate SU2, the engine ECU 22 causes the urea water injector 52 to supply the urea water in the second supply mode.

At this time, the engine 2 is operated in the second operation mode, and in the second operation mode, the engine 2 is operated in a lower-speed, lower-load operation region than in the case of the first operation mode, as stated above. In the second supply mode, the engine ECU 22 carries out the supply of the urea water from the urea water injector 52 in accordance with such operating state of the engine 2 so that a larger amount of ammonia produced from the urea water may be adsorbed by the SCR catalyst 48, as in the first embodiment. Namely, while the engine 2 is operated in the second operation mode, the engine ECU 22 executes the adsorption increasing operation to increase the amount of ammonia adsorbed by the SCR catalyst 48.

The amount of the urea water supplied in the second supply mode is also set in the same manner as in the first embodiment. Specifically, the urea water supply amount M2' to be supplied per unit time is obtained which corresponds to the ammonia supply amount required per unit time to selectively reduce the NOx while the engine 2 is operated in the second operation mode. Also, like the first embodiment, based on the maximum adsorption amount Q2 up to which the SCR catalyst 48 can adsorb ammonia while the engine 2 is operated in the second operation mode, the urea water supply amount M2" to be supplied per unit time is obtained which is required to cause the SCR catalyst 48 to adsorb ammonia up to the maximum adsorption amount Q2. The engine ECU 22 stores the sum of the thus-obtained urea water supply amounts M2' and M2" as the second target supply amount M2 for the second supply mode. Then, the engine ECU 22 controls the urea water injector 52 such that the second target supply amount M2 of the urea water is supplied to the exhaust gas.

While the engine 2 is operated in the second operation mode, the exhaust temperature is lower than when the engine is operated in the first operation mode, and therefore, a larger amount of ammonia can be adsorbed by the SCR catalyst 48, as stated above. Also, the second target supply amount M2 of the urea water for the second supply mode is set to be equal to the sum of the urea water supply amount M2', which corresponds to the ammonia supply amount needed to selectively reduce the NOx, and the urea water supply amount M2", which allows the SCR catalyst 48 to adsorb ammonia up to the maximum adsorption amount Q2. Accordingly, the SCR catalyst 48 can be made to adsorb the largest possible amount of ammonia without causing ammonia slip from the SCR catalyst 48.

If the storage rate SOC of the battery 8 being charged reaches the second upper-limit storage rate SU2, it is judged that the charging of the battery 8 is completed. Thus, the engine 2 is stopped, and the engine ECU 22 stops the supply of the urea water from the urea water injector 52.

The urea water supply control is executed in this manner by the engine ECU 22, whereby the supply of the urea water from the urea water injector 52 is kept stopped by the engine ECU 22 during the period after the storage rate SOC of the battery 8 drops below the lower-limit storage rate SL and thus the engine 2 is started until the temperature Tc of the exhaust gas flowing into the SCR catalyst 48 reaches the predetermined temperature Ta, because the exhaust temperature of the engine 2 remains low for a while after the engine 2 is started.

The engine 2, on the other hand, is already started and is operated first in the ramp mode, as stated above. In the ramp mode, the revolution speed of the engine 2 is gradually increased from the idling speed following the startup to the first target revolution speed for the first operation mode. Also, the electric power generated by the generator 4 is gradually increased from "0" to the first target electric power for the first operation mode in a manner coordinated with the engine operation in the ramp mode, so that the load of the engine 2 gradually increases.

At this time, the SCR catalyst 48 already adsorb a large amount of ammonia, because of the adsorption increasing operation executed when the battery 8 was charged the previous time. Thus, when the exhaust temperature is increased after the start of the engine 2 to such an extent that the SCR catalyst 48 becomes capable of selectively reducing NOx, the NOx contained in the exhaust gas from the engine 2 is selectively reduced by using, as a reducing agent, the ammonia adsorbed by the SCR catalyst 48, whereby the exhaust gas is purified. In this manner, the amount of the ammonia adsorbed by the SCR catalyst 48 gradually decreases because of the selective reduction. On the other hand, as shown in FIG. 6, the maximum ammonia adsorption amount of the SCR catalyst 48 gradually decreases with increase in the temperature of the SCR catalyst 48, as in the first embodiment.

The rate of increase of the revolution speed of the engine 2 and of the electric power generated by the generator 4 in the ramp mode is determined in accordance with such change in the ammonia adsorption amount.

Specifically, the amount of ammonia adsorbed by the SCR catalyst 48 during the adsorption increasing operation gradually decreases as the ammonia is used to selectively reduce the NOx in the exhaust gas after the start of the engine 2. On the other hand, the maximum amount of ammonia that the SCR catalyst 48 can adsorb gradually decreases with increase in the temperature of the SCR catalyst 48, as shown in FIG. 6. Thus, the rate of decrease of ammonia due to the selective reduction is obtained in advance by experiment, and a rate of increase in the temperature of the SCR catalyst 48 is obtained such that the rate of decrease in the maximum ammonia adsorption amount does not become greater than the experimentally obtained rate of decrease of ammonia due to the selective reduction. Then, the rate of increase in the revolution speed of the engine 2 in the ramp mode and the rate of increase in the electric power generated by the generator 4 in the ramp mode, which corresponds to the rate of increase in the load of the engine 2, are set so that the exhaust temperature may rise at such a rate as to attain the obtained rate of increase in the catalyst temperature.

The engine 2 is operated in the ramp mode in this manner, so that the revolution speed and load of the engine 2 gradually increase. Thus, compared with the case where the engine 2 is operated in the first operation mode immediately after the startup, the exhaust temperature of the engine 2 rises gently, and also the temperature of the SCR catalyst 48 rises gently. Consequently, during the period after the engine 2 is started to be operated in the ramp mode until the engine operation mode is switched to the first operation mode, the amount of ammonia adsorbed by the SCR catalyst 48 does not become larger than the maximum ammonia adsorption amount of the SCR catalyst 48 at the present catalyst temperature during the period. The operation of the engine 2 can therefore be switched from the ramp mode to the first operation mode without causing ammonia slip.

Even after the operation of the engine 2 is switched from the ramp mode to the first operation mode, the NOx in the exhaust gas is selectively reduced by using, as a reducing agent, the ammonia adsorbed by the SCR catalyst 48, whereby the exhaust gas is purified. While the ammonia adsorbed by the SCR catalyst 48 is used in this manner to purify the exhaust gas, the exhaust temperature of the engine 2 gradually rises, and if it is judged that the exhaust temperature Tc has reached the predetermined temperature Ta, the urea water is supplied from the urea water injector 52 in the first supply mode.

Accordingly, also in this embodiment, even if the engine 2 is repeatedly started and stopped to charge the battery 8, the NOx is selectively reduced by the ammonia that has already been adsorbed by the SCR catalyst 48, while the exhaust temperature remains low after the start of the engine 2, as in the first embodiment. The exhaust gas from the engine 2 can therefore be satisfactorily purified from the time just after the start of the engine 2.

Further, in this embodiment, the engine 2 is operated first in the ramp mode after being started, and the operation of the engine 2 is then switched to the first operation mode, so that the exhaust temperature of the engine 2 rises moderately. As a result, the amount of ammonia adsorbed by the SCR catalyst 48 does not become larger than the maximum ammonia adsorption amount of the SCR catalyst 48 at the present catalyst temperature during the operation of the engine, and therefore, the occurrence of ammonia slip is reliably prevented.

Figure 9:
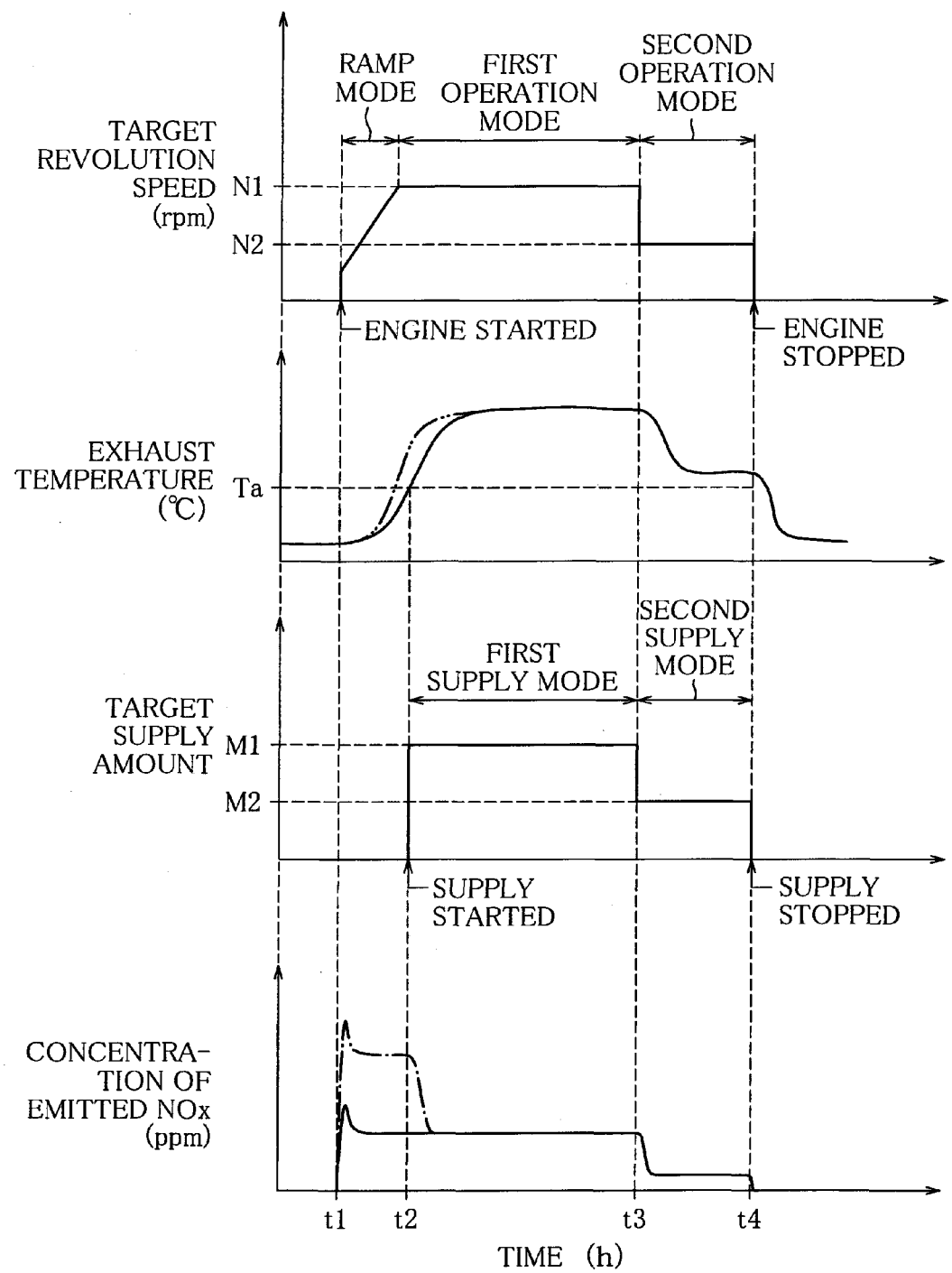
FIG. 9 is a time chart illustrating the relationship of temporal changes in various values according to the second embodiment, the values including the target engine revolution speed set by the engine operation control, the temperature of the exhaust gas flowing into the SCR catalyst, the target urea water supply amount set by the urea water supply control, and the NOx concentration of the exhaust gas emitted from the exhaust aftertreatment device.

FIG. 9 illustrates how various values change with time when the charge control and the engine operation control are executed by the HEV-ECU 20 and the urea water supply control is executed by the engine ECU 22, the values including the target revolution speed of the engine 2, the temperature of the exhaust gas flowing into the SCR catalyst 48, the target supply amount of the urea water, and the concentration of the NOx emitted from the exhaust aftertreatment device 36.

If the storage rate of the battery 8 drops below the lower-limit storage rate SL and the engine 2 is started at time t1 in FIG. 9, the engine 2 is operated in the ramp mode, so that the revolution speed of the engine 2 is gradually increased from the idling speed to the first target revolution speed for the first operation mode. Although not illustrated in the figure, the electric power generated by the generator 4 is also gradually increased from "0" to the first target electric power for the first operation mode, so that the load of the engine 2 gradually increases.

In this case, the exhaust temperature of the engine 2 changes in the manner indicated by the solid line in FIG. 9. Namely, the exhaust temperature of the engine 2 rises more gently than in the case where the revolution speed of the engine 2 and the electric power generated by the generator 4 are raised to the first target revolution speed and the first target electric power, respectively, immediately after the engine 2 is started, indicated by the dot-dot-dash line in FIG. 9. As the exhaust temperature rises gently, the temperature of the SCR catalyst 48 also increases moderately. Accordingly, the amount of ammonia adsorbed by the SCR catalyst 48 does not become larger than the maximum ammonia adsorption amount of the SCR catalyst 48 at the present catalyst temperature during this period of time, as stated above, and therefore the occurrence of ammonia slip is reliably prevented.

On completion of the ramp-mode operation of the engine 2, the operation mode of the engine 2 is switched to the first operation mode in which the revolution speed of the engine 2 is set to the first target revolution speed N1. At this time, the generator 4 is controlled by the HEV-ECU 20 so as to generate the first target electric power at the first target revolution speed N1.

After the engine 2 is started, the exhaust temperature of the engine 2 gradually rises, but for a certain period of time after the start of the engine 2, the exhaust temperature remains lower than the predetermined temperature Ta at which the urea water is allowed to be supplied from the urea water injector 52. Accordingly, the target supply amount of the urea water is not set with respect to the urea water injector 52, so that no urea water is supplied from the urea water injector 52. Thus, where ammonia was not adsorbed by the SCR catalyst 48 while the battery 8 was charged the previous time, the exhaust gas emitted from the exhaust aftertreatment device 36 just after the start of the engine 2 is not purified and has a high concentration of NOx, as indicated by the dot-dash line in FIG. 9. In this embodiment, by contrast, while the battery 8 was charged the previous time, the SCR catalyst 48 absorbed a large amount of ammonia, as stated above. Accordingly, although the urea water is not supplied from the urea water injector 52, the NOx is selectively reduced by using, as a reducing agent, the ammonia adsorbed by the SCR catalyst 48. The NOx concentration of the exhaust gas can therefore be suppressed to a low level from the start of the engine 2, as indicated by the solid line in FIG. 9, whereby lowering in the purification efficiency of the SCR catalyst 48 is prevented. A short-lasting rise in the NOx concentration just after the start of the engine 2 is attributable to the incremental control of the fuel supply quantity executed at the start of the engine 2 and the activation of the SCR catalyst 48.

After completion of the ramp-mode operation, the engine 2 is kept operating in the first operation mode, so that the exhaust temperature of the engine 2 increases. When the exhaust temperature of the engine 2 reaches the predetermined temperature Ta at time t2, the urea water injector 52 is controlled in the first supply mode and starts to supply the target supply amount M1 of the urea water. Ammonia produced from the urea water is supplied to the SCR catalyst 48 to continue the selective reduction of the NOx, whereby the exhaust gas is purified. At this time, since the engine 2 is operated in the first operation mode to cause the generator 4 to generate the first target electric power, the exhaust temperature of the engine 2 rises to about 500° C., for example.

The battery 8 is progressively charged thereafter with the electric power generated by the generator 4 driven by the engine 2, and when the storage rate SOC of the battery 8 reaches the first upper-limit storage rate SU1 at time t3, the operation mode of the engine 2 is switched from the first operation mode to the second operation mode, in which the engine 2 is operated at the second target revolution speed N2 lower than the first target revolution speed N1. At this time, the generator 4 is controlled by the HEV-ECU 20 so as to generate the second target electric power, which is smaller than the first target electric power, at the second target revolution speed N2. Thus, the engine 2 is operated in a lower-speed, lower-load operation region than in the first operation mode, and the exhaust temperature of the engine 2 lowers to a temperature (e.g., 250° C.) slightly higher than the predetermined temperature Ta at which the urea water is allowed to be supplied from the urea water injector 52.

Such decrease in the exhaust temperature permits the SCR catalyst 48 to adsorb more ammonia than when the engine 2 is operated in the first operation mode. Accordingly, when the operation mode of the engine 2 is switched to the second operation mode, the engine ECU 22 switches the urea water supply mode of the urea water injector 52 from the first supply mode to the second supply mode, in which the second target supply amount M2 is selected as the target supply amount of the urea water from the urea water injector 52.

Also in this embodiment, the second target supply amount M2 is smaller than the first target supply amount M1, like the first embodiment. The reason is that the concentration of the NOx discharged from the engine 2 significantly lowers because of the switchover of the operation mode of the engine 2 to the second operation mode and the consequent decrease in the exhaust temperature. Depending on the characteristics of the SCR catalyst 48 or the extent to which the exhaust temperature of the engine 2 lowers in the second operation mode, however, the second target supply amount M2 is set to be larger than the first target supply amount M1.

Since, in the second operation mode, the engine 2 is operated in a lower-speed, lower-load operation region than in the first operation mode, the NOx concentration of the exhaust gas discharged from the engine 2 is lower than that in the first operation mode, as stated above. Consequently, the NOx concentration of the exhaust gas emitted from the exhaust aftertreatment device 36 also lowers. Also, since the temperature of the SCR catalyst 48 lowers as the exhaust temperature of the engine 2 lowers, the SCR catalyst 48 adsorbs a larger amount of ammonia than when the engine 2 is operated in the first operation mode, as shown in FIG. 6.

The operation of the engine 2 in the second operation mode and the supply of the urea water in the second supply mode are continued until the storage rate SOC of the battery 8 being charged reaches the second upper-limit storage rate SU2 at time t4, and are terminated when the charging of the battery 8 is completed with its storage rate SOC increased up to the second upper-limit storage rate SU2. Thus, prior to the termination of the charging of the battery 8, the engine 2 is operated in the second operation mode and the urea water is supplied from the urea water injector 52 in the second supply mode over the predetermined period from the time t3 to t4 in FIG. 9, so that a large amount of ammonia is adsorbed by the SCR catalyst 48.

As stated above, the engine 2 is used exclusively for driving the generator 4 and is operated in the second operation mode, that is, under almost fixed operating conditions, after the storage rate SOC of the battery 8 reaches the first upper-limit storage rate SU1 until the storage rate SOC further increases up to the second upper-limit storage rate SU2. Accordingly, the period from the time t3 to t4 in FIG. 9 is almost fixed. By adjusting the first upper-limit storage rate SU1, therefore, it is possible to set the period over which the engine 2 is operated in the second operation mode, to a desired length so as to match the characteristics of the engine 2, the SCR catalyst 48 or the like.

In this manner, the engine 2 is operated in the second operation mode and the urea water is supplied from the urea water injector 52 in the second supply mode over the predetermined period before the engine 2 is stopped upon completion of the charging of the battery 8, whereby a large amount of ammonia is adsorbed by the SCR catalyst 48. Accordingly, when the storage rate SOC of the battery 8 again drops below the lower-limit storage rate SL and thus charging of the battery 2 is started but the urea water is not supplied from the urea water injector 52 because the exhaust temperature is low, the NOx contained in the exhaust gas is selectively reduced by the ammonia that has already been adsorbed by the SCR catalyst 48, whereby the exhaust gas can be purified.

Also, when the urea water is supplied from the urea water injector 52 in the second supply mode, the target urea water supply amount M2 is set to be equal to the sum of the urea water supply amount M2', which corresponds to the supply amount of ammonia necessary to selectively reduce the NOx when the engine 2 is operated in the second operation mode, and the urea water supply amount M2", which is necessary for the SCR catalyst 48 to adsorb ammonia up to the maximum adsorption amount Q2. Thus, the largest possible amount of ammonia can be adsorbed by the SCR catalyst 48 without causing ammonia slip from the SCR catalyst 48.

Further, the adsorption increasing operation for increasing the amount of ammonia adsorbed by the SCR catalyst 48 is executed while the battery 8 is charged. It is therefore unnecessary to operate the engine 2 for an extra period of time to increase the amount of ammonia adsorbed by the SCR catalyst 48, thus preventing lowering in the fuel efficiency of the engine 2.

Although the exhaust purification device for a hybrid electric vehicle according to the second embodiment of the present invention has been described above, it is to be noted that the present invention is not limited to the first and second embodiments alone. For the elements and construction of the second embodiment identical with those of the first embodiment, modifications similar to those mentioned with respect to the first embodiment may be made in the second embodiment.

Also, in the second embodiment, while the engine 2 is operated in the ramp mode, the revolution speed of the engine 2 is varied so as to increase at a preset rate of increase of the engine revolution speed and the electric power generated by the generator 4 is increased at a preset rate of increase of the generated electric power. However, the method of increasing the engine revolution speed and the method of increasing the generated electric power are not particularly limited and some other suitable methods may be adopted instead.

For example, the amount of ammonia adsorbed by the SCR catalyst 48 may be estimated, and the rate of increase of the engine revolution speed and the rate of increase of the generated electric power may be adjusted on the basis of, the exhaust temperature detected by the exhaust temperature sensor 54 so that the estimated ammonia adsorption amount may not exceed the maximum ammonia adsorption amount shown in FIG. 6.

In this case, the rate of increase of the engine revolution speed and that of the generated electric power are adjusted, for example, in the manner described below. When the revolution speed of the engine 2 reaches the first target revolution speed N1 for the first operation mode, the electric power generated by the generator 4 is set to the first target electric power, as in the second embodiment. It is a prerequisite condition for setting the rates. The relationship between the revolution speed of the engine 2 and the electric power generated by the generator 4 in varying the revolution speed and generated electric power is obtained beforehand by experiment, which is carried out meeting the above-described perquisite condition and taking into account the operation efficiency of the engine 2, the exhaust characteristics and the like. The rate of increase of the engine revolution speed and the rate of increase of the generated electric power set on the basis of the obtained relationship is stored as a map. The remaining ammonia adsorption amount of the SCR catalyst 48 is estimated by using, as an initial value, the amount of ammonia adsorbed by the SCR catalyst 48 during the adsorption increasing operation executed in the second operation mode, and based on the amount of ammonia consumed by the selective reduction of NOx while the engine 2 is operated in the ramp mode. Then, the catalyst temperature at which the maximum adsorption amount of the SCR catalyst 48 is equal to the estimated remaining ammonia adsorption amount is obtained from the relationship illustrated in FIG. 6. Using the aforementioned map, the engine ECU 22 and the HEV-ECU 20 control the engine 2 and the inverter 6, respectively, to vary the revolution speed of the engine 2 and the electric power generated by the generator 4 so that the obtained catalyst temperature may become equal to the temperature of the SCR catalyst 48 estimated from the exhaust temperature detected by the exhaust temperature sensor (catalyst temperature detection unit) 54.

The engine and the inverter are controlled in this manner in the ramp mode on the basis of the exhaust temperature detected by the exhaust temperature sensor 54, and thus, the revolution speed of the engine 2 and the electric power generated by the generator 4 gradually increase to the first target revolution speed N1 and the first target electric power, respectively, so that the amount of ammonia adsorbed by the SCR catalyst 48 may not become larger than the maximum ammonia adsorption amount of the SCR catalyst 48. Consequently, the exhaust temperature of the engine 2 can be raised to decrease the maximum ammonia adsorption amount so as to correspond to the actual ammonia adsorption amount that decreases due to the selective reduction of NOx by the SCR catalyst 48. Thus, the occurrence of ammonia slip at the start of the engine can be reliably prevented and at the same time the elevation of the exhaust temperature need not be delayed more than necessary. As a result, the exhaust temperature can be raised as quickly as possible to the predetermined temperature Ta at which the urea water is allowed to be supplied.

In this modification, the remaining ammonia adsorption amount of the SCR catalyst 48 is estimated by using, as the initial value, the amount of ammonia adsorbed by the SCR catalyst 48 during the previous adsorption increasing operation executed in the second operation mode. As stated above, the adsorption increasing operation is executed so as to allow the SCR catalyst 48 to adsorb ammonia up to the maximum adsorption amount Q2 at the catalyst temperature T2 indicated in FIG. 6, and therefore, the initial value of the ammonia adsorption amount is equal to the maximum adsorption amount Q2.

A method explained below may alternatively be adopted where consideration needs to be given to a situation in which the maximum adsorption amount of ammonia is not adsorbed by the SCR catalyst 48. Specifically, based on the amount of NOx discharged from the engine 2 operated in the second operation mode, the engine ECU 22 obtains an amount of ammonia that is consumed by the selective reduction of this amount of NOx, and also obtains an amount of ammonia that is produced from the urea water supplied from the urea water injector 52 in the second supply mode. Subsequently, based on the difference between the obtained two amounts of ammonia, the engine ECU 22 estimates the amount of ammonia adsorbed by the SCR catalyst 48, and obtains an initial value of the ammonia adsorption amount on the basis of the estimated value.

In the second embodiment, while the engine 2 is operated in the ramp mode, the exhaust temperature of the engine 2 is made to rise gently by gradually increasing the revolution speed of the engine 2 and also by gradually increasing the electric power generated by the generator 4 to progressively increase the load of the engine 2. The method of moderating the rate of increase in the exhaust temperature of the engine 2 is, however, not limited to the mentioned method alone. For example, the revolution speed of the engine 2 may be set to the first target revolution speed for the first operation mode immediately after the start of the engine 2, and only the electric power generated by the generator 4 may be gradually increased up to the first target electric power for the first operation mode to progressively increase the load of the engine 2. Further, the exhaust temperature may be gradually raised by gradually varying other control amount of the engine 2 than the aforementioned ones.

Moreover, when the engine 2 is operated in the ramp mode, the idling speed is used as a starting point from which the revolution speed of the engine 2 is increased, while "0" is used as a starting point from which the electric power generated by the generator 4 is increased. The starting points are not limited to these values and may be changed to larger values.

In the second embodiment, the period of execution of the adsorption increasing operation is set on the basis of the storage rate SOC of the battery 8, as in the first embodiment. As stated above, the method of setting the duration of the adsorption increasing operation is not limited to such method alone.

Also, in the second embodiment, each time the battery 8 is charged, the engine 2 is operated in the ramp mode, the first operation mode and the second operation mode, and the respective operating conditions are almost the same in the corresponding operation modes, as in the first embodiment. Thus, the period of time after charging of the battery 8 is started until the charging is completed with the storage rate SOC of the battery 8 increased to the second upper-limit storage rate is almost fixed. Accordingly, as stated above with reference to the modification of the first embodiment, a timer may be used, for example, to measure the time elapsed after the storage rate SOC of the battery 8 drops below the lower-limit storage rate SL and thus charging of the battery 8 is started, and when the measured time reaches a predetermined time, the adsorption increasing operation may be started.

Further, when the battery 8 needs to be charged, the engine 2 may be operated first in the ramp mode, and after completion of the ramp-mode operation, the operation of the engine 2 in the first operation mode and the supply of the urea water in the first supply mode may be continued until the charging of the battery 8 is completed. The adsorption increasing operation may be executed for a predetermined period after the charging of the battery 8 is completed, by operating the engine 2 in the second operation mode and supplying the urea water in the second supply mode.

In this case, while the adsorption increasing operation is executed, the HEV-ECU 20 controls the inverter 6 so that the generator 4 does not generate electric power. Thus, the motive power of the engine 2 does not contribute to the charging of the battery 8, so that the fuel efficiency of the engine 2 lowers correspondingly. However, the time period for executing the adsorption increasing operation can be set with accuracy by means of the timer.

The invention claimed is:

1. An exhaust purification device for a hybrid electric vehicle, in which a generator is driven by using power from an engine which is not used for moving the vehicle, electric power generated by the generator is stored in a battery, and an electric motor that is driven by the electric power supplied from the battery is used as a power source for moving the vehicle, comprising:
   an ammonia selective reduction-type NOx catalyst interposed in an exhaust passage of the engine, for selectively reducing NOx contained in exhaust gas by using ammonia as a reducing agent;
   a urea water supply unit for supplying urea water into the exhaust gas existing upstream of the ammonia selective reduction-type NOx catalyst; and
   a control unit for starting or stopping the engine in accordance with a storage state of the battery and controlling the urea water supply unit in accordance with an operating state of the engine, wherein
   when the engine in operation is to be stopped, the control unit stops the engine after executing, over a predetermined period prior to stoppage of the engine, an adsorption increasing operation in which an amount of ammonia adsorbed by the ammonia selective reduction-type NOx catalyst is increased, compared with that before the predetermined period.

2. The exhaust purification device for a hybrid electric vehicle according to claim 1, wherein the control unit executes the adsorption increasing operation by controlling the engine such that temperature of the exhaust gas flowing into the ammonia selective reduction-type NOx catalyst is lowered, compared with that during operation of the engine and before the predetermined period.

3. The exhaust purification device for a hybrid electric vehicle according to claim 2, wherein the control unit causes revolution speed of the engine to be lowered, compared with that before the predetermined period, to lower the temperature of the exhaust gas flowing into the ammonia selective reduction-type NOx catalyst.

4. The exhaust purification device for a hybrid electric vehicle according to claim 2, wherein the control unit causes load of the engine to be lowered, compared with that before the predetermined period, to lower the temperature of the exhaust gas flowing into the ammonia selective reduction-type NOx catalyst.

5. The exhaust purification device for a hybrid electric vehicle according to claim 1, wherein, while the adsorption increasing operation is executed, the control unit controls the urea water supply unit to supply a target supply amount of the urea water, which is set on the basis of an amount of ammonia consumed by reduction of the NOx by the ammonia selective reduction-type NOx catalyst and a maximum amount of ammonia that can be adsorbed by the ammonia selective reduction-type NOx catalyst.

6. The exhaust purification device for a hybrid electric vehicle according to claim 1, wherein the control unit sets, as the predetermined period, a period after the storage rate of the battery charged by operating the engine reaches a predetermined first upper-limit storage rate until the storage rate of the battery increases up to a predetermined second upper-limit storage rate higher than the first upper-limit storage rate, and stops the engine when the storage rate of the battery reaches the second upper-limit storage rate.

7. The exhaust purification device for a hybrid electric vehicle according to claim 1, wherein, when the battery needs to be charged, the control unit starts the engine to operate to charge the battery, then executes the adsorption increasing operation over the predetermined period after charging of the battery is completed, and subsequently stops the engine.

8. The exhaust purification device for a hybrid electric vehicle according to claim 1, wherein:
   during operation of the engine, the control unit controls the engine with a control amount of the engine set to a predetermined target control amount, and
   after the engine is started, the control unit causes the control amount of the engine to gradually approach the target control amount such that a rate of increase in exhaust temperature of the engine is gentler than when the control amount of the engine is immediately set to the target control amount.

9. The exhaust purification device for a hybrid electric vehicle according to claim 8, wherein the control unit sets, as the target control amount, a target revolution speed of the engine, and after the engine is started, the control unit causes the revolution speed of the engine to gradually increase to the target revolution speed.

10. The exhaust purification device for a hybrid electric vehicle according to claim 8, wherein the control unit sets the target control amount equal to a control amount of the engine with which the generator generates target electric power, and after the engine is started, the control unit varies the control amount of the engine to the target control amount such that the electric power generated by the generator gradually increases to the target electric power.

11. The exhaust purification device for a hybrid electric vehicle according to claim 8, further comprising catalyst temperature detection unit for detecting temperature of the ammonia selective reduction-type NOx catalyst,
   wherein, after the engine is started, the control unit causes the control amount of the engine to gradually approach the target control amount on the basis of the temperature of the ammonia selective reduction-type NOx catalyst detected by the catalyst temperature detection unit such that while the exhaust temperature of the engine is increased, the temperature of the ammonia selective reduction-type NOx catalyst is continuously controlled to a temperature at which a maximum amount of ammonia that can be adsorbed by the ammonia selective reduction-type NOx catalyst is larger than or equal to an amount of ammonia actually adsorbed by the ammonia selective reduction-type NOx catalyst.

12. The exhaust purification device for a hybrid electric vehicle according to claim 8, wherein the control unit executes the adsorption increasing operation by controlling the engine such that the temperature of the exhaust gas flowing into the ammonia selective reduction-type NOx catalyst is lowered, compared with that during the operation of the engine and before the predetermined period.

* * * * *